(12) United States Patent
Agrawal et al.

(10) Patent No.: US 10,258,908 B2
(45) Date of Patent: Apr. 16, 2019

(54) FILTER MODULE WITH WINDOW TYPE CLEAR BOWL

(71) Applicant: Cummins Filtration IP, Inc., Columbus, IN (US)

(72) Inventors: Shubha Agrawal, Jaipur (IN); Hariprasad Mohan Bhalerao, Pune (IN); Amit Shashikant Wankhede, Pune (IN); Ajay D. Joshi, Pune (IN); Kevin C. South, Cookeville, TN (US)

(73) Assignee: Cummons Filtration IP, Inc., Columbus, IN (US)

( * ) Notice: Subject to any disclaimer, the term of this patent is extended or adjusted under 35 U.S.C. 154(b) by 94 days.

(21) Appl. No.: 15/304,012

(22) PCT Filed: Apr. 14, 2015

(86) PCT No.: PCT/US2015/025653
§ 371 (c)(1),
(2) Date: Oct. 13, 2016

(87) PCT Pub. No.: WO2015/160736
PCT Pub. Date: Oct. 22, 2015

(65) Prior Publication Data
US 2017/0043283 A1 Feb. 16, 2017

(30) Foreign Application Priority Data
Apr. 18, 2014 (IN) .......................... 2015/CHE/2014

(51) Int. Cl.
*B01D 29/96* (2006.01)
*B01D 35/30* (2006.01)
*B01D 36/00* (2006.01)

(52) U.S. Cl.
CPC ............. *B01D 29/96* (2013.01); *B01D 35/30* (2013.01); *B01D 36/005* (2013.01);
(Continued)

(58) Field of Classification Search
CPC ........ B01D 2201/307; B01D 2201/309; B01D 2201/4084; B01D 2201/4076;
(Continued)

(56) References Cited

U.S. PATENT DOCUMENTS 4,271,015 A * 6/1981 Moore ................ B01D 35/143
210/282
4,619,764 A 10/1986 Church et al.
(Continued)

OTHER PUBLICATIONS

International Search Report and Written Opinion issued for PCT/US2015/025653, dated Jul. 1, 2015, 13 pages.

*Primary Examiner* — Terry K Cecil
(74) *Attorney, Agent, or Firm* — Foley & Lardner LLP

(57) ABSTRACT

A filter including a shell with at least one viewing region, a translucent bowl that fits and is installable within the shell, and an attachment mechanism. The bowl is positionable within the shell such that at least a portion of the bowl is visible through the viewing region. The attachment mechanism securely attaches the bowl the shell together and prevents at least one of vertical and rotational movement between the bowl and the shell. The shell and the bowl are not threaded to each other.

24 Claims, 32 Drawing Sheets

(52) U.S. Cl.
CPC ............... *B01D 2201/309* (2013.01); *B01D 2201/4076* (2013.01); *B01D 2201/4084* (2013.01)

(58) Field of Classification Search
CPC .... B01D 35/30; B01D 36/005; B01D 36/006; B01D 17/0214; B01D 17/045; B01D 46/4254
See application file for complete search history.

(56) References Cited

U.S. PATENT DOCUMENTS

| | | | | |
|---|---|---|---|---|
| 4,735,288 | A | * | 4/1988 | Uematsu ................ F16N 7/34 184/55.1 |
| 4,774,853 | A | * | 10/1988 | Takahashi ........... B01D 35/153 74/606 R |
| 4,836,925 | A | * | 6/1989 | Wolf .................... B01D 29/114 210/323.2 |
| 4,992,166 | A | | 2/1991 | Lowsky et al. |
| 5,547,565 | A | | 8/1996 | Biere et al. |
| 6,139,738 | A | | 10/2000 | Maxwell |
| 8,147,691 | B2 | | 4/2012 | Krull et al. |
| 8,474,647 | B2 | * | 7/2013 | Vinjamuri ................ F17C 1/02 220/4.12 |
| 9,314,726 | B2 | * | 4/2016 | Yamase ............. B01D 46/2414 |
| 2007/0039870 | A1 | * | 2/2007 | Scanlan ............... B01D 29/114 210/445 |
| 2009/0184041 | A1 | | 7/2009 | Hoverson et al. |
| 2013/0186815 | A1 | * | 7/2013 | Cupit .................... B01D 29/15 210/232 |

* cited by examiner

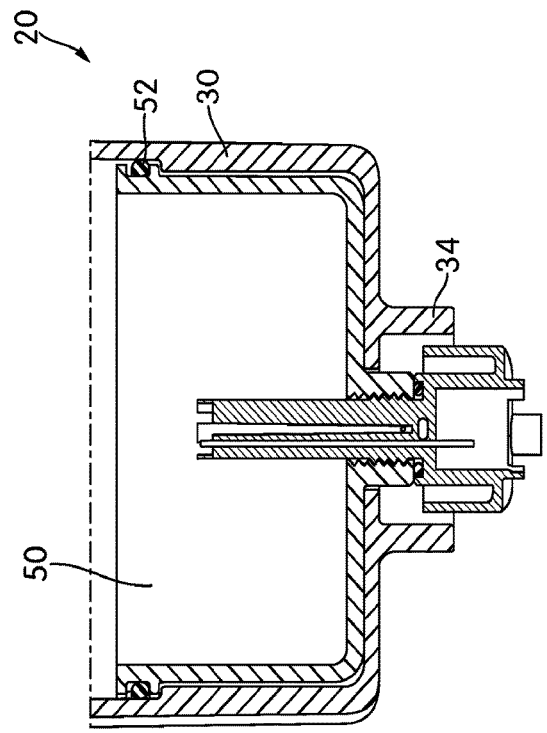
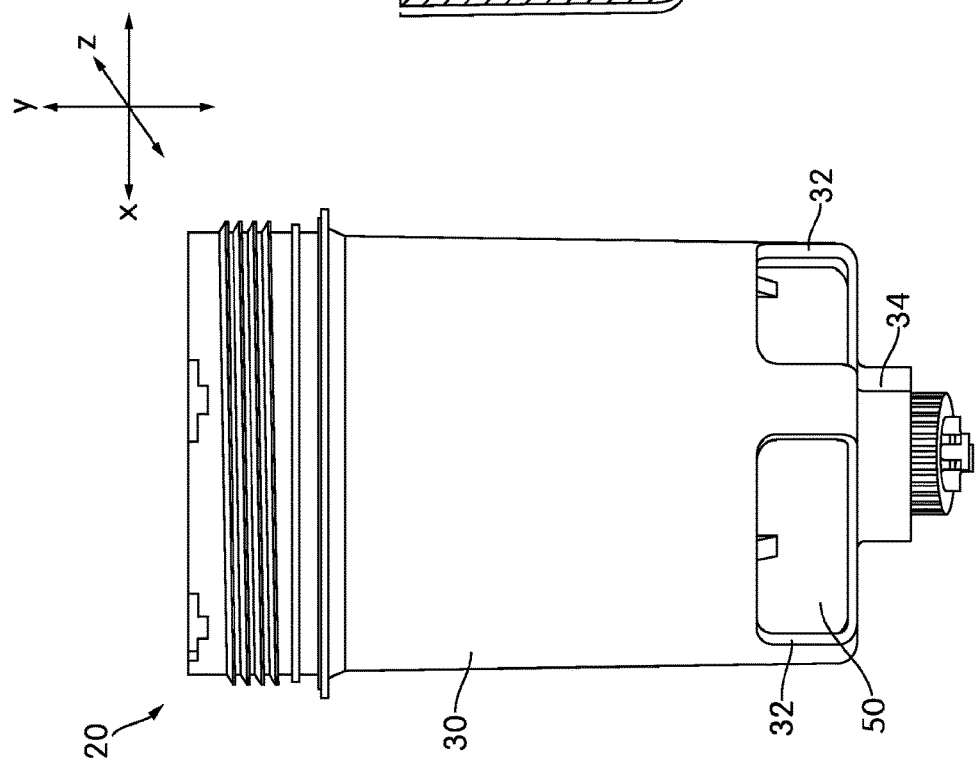
FIG. 1B
FIG. 1A

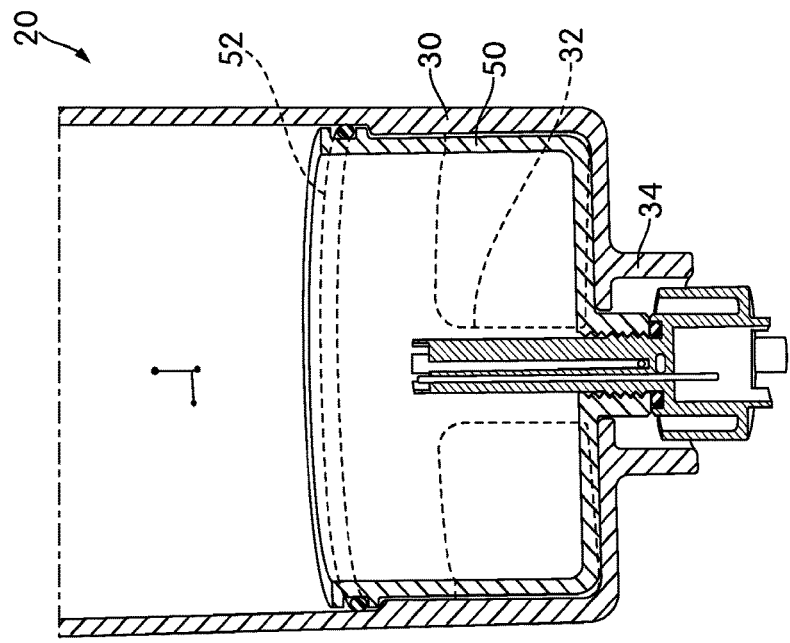
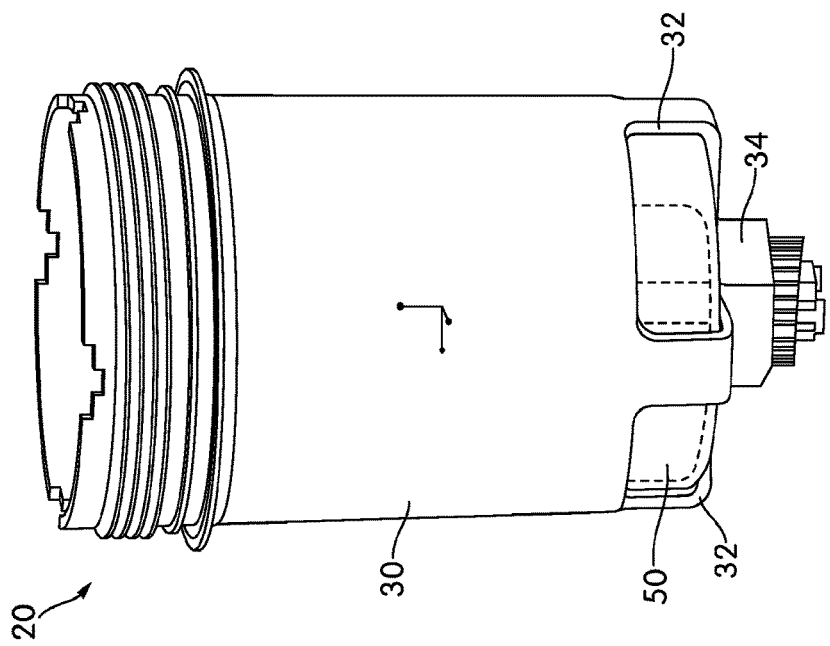
FIG. 2B
FIG. 2A

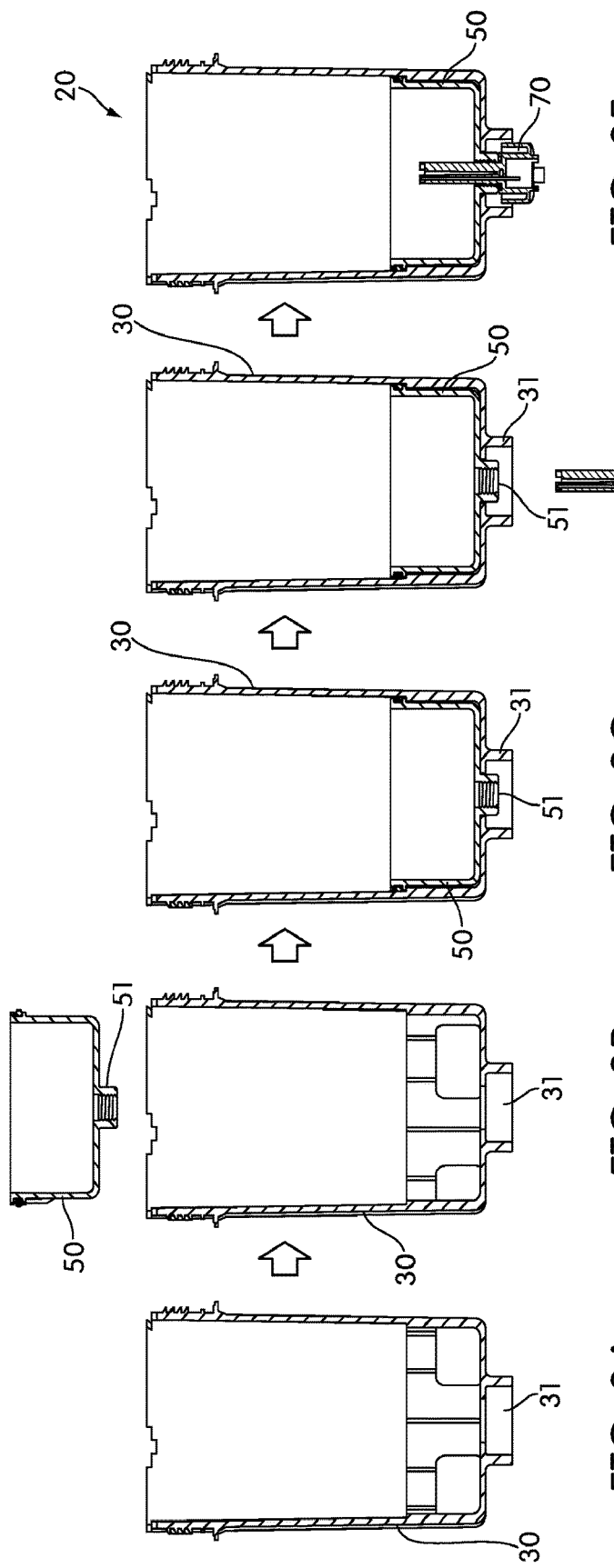

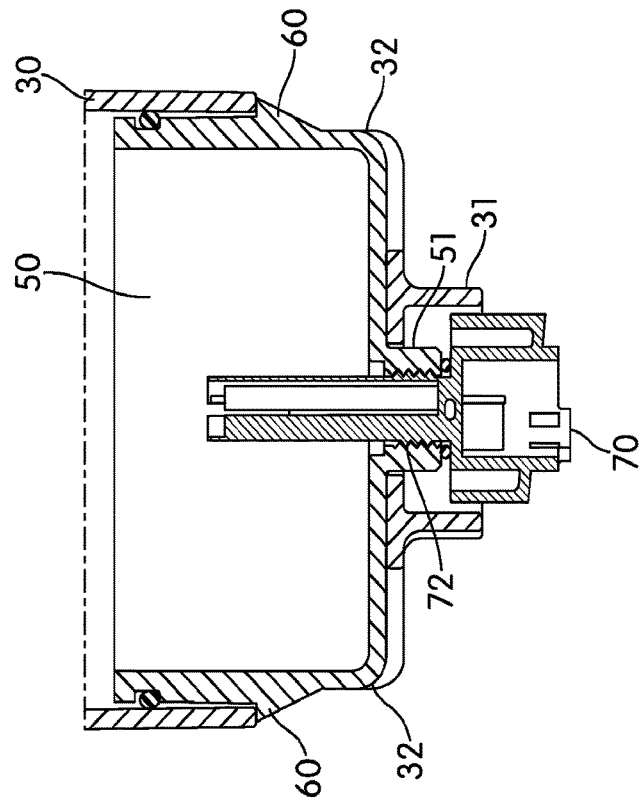
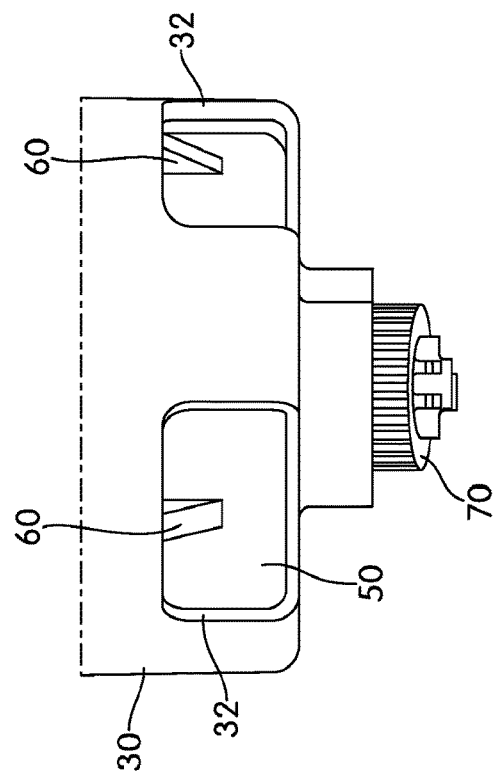
FIG. 4B
FIG. 4A

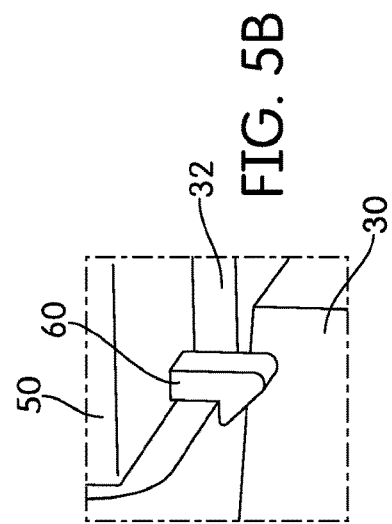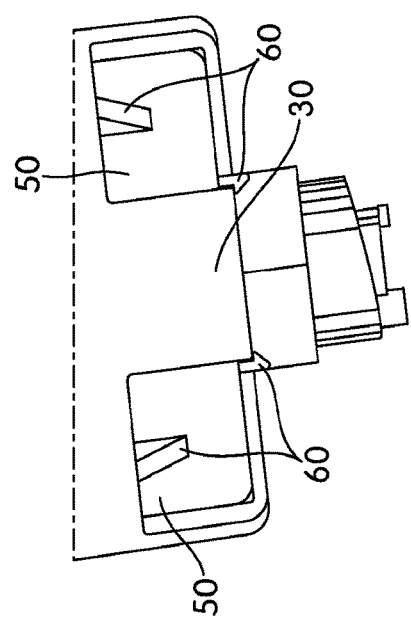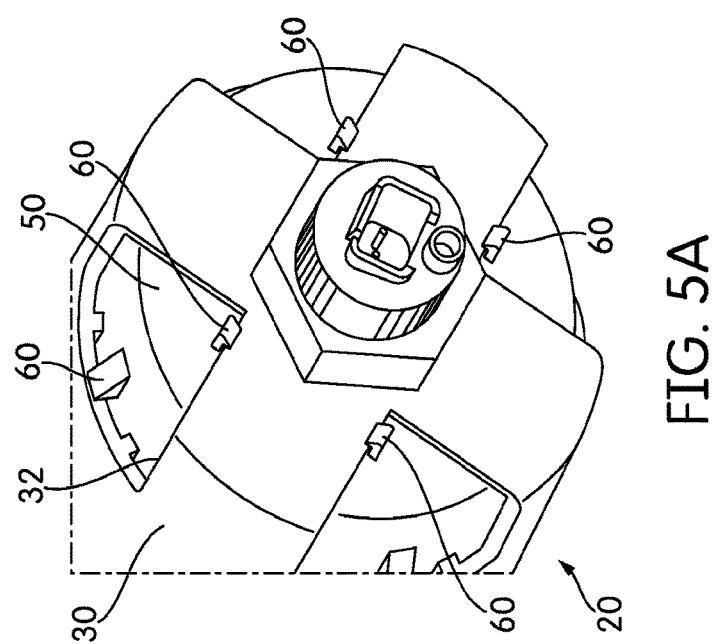

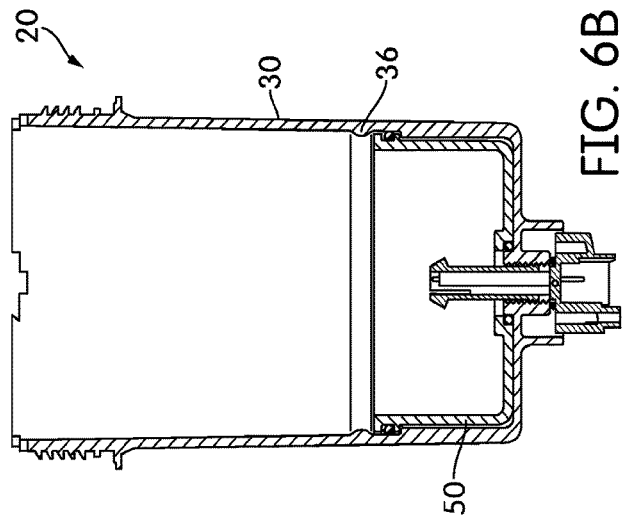
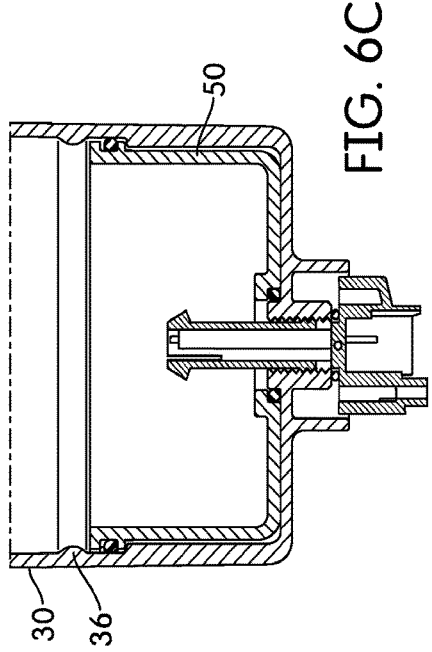
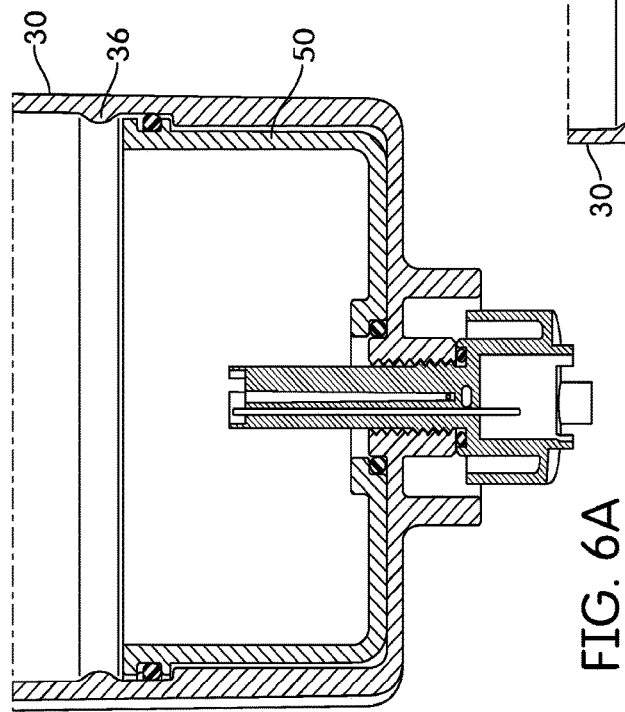

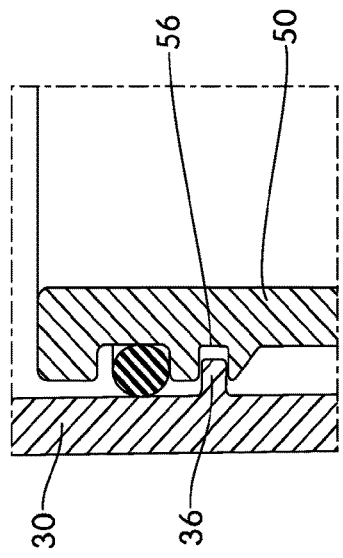
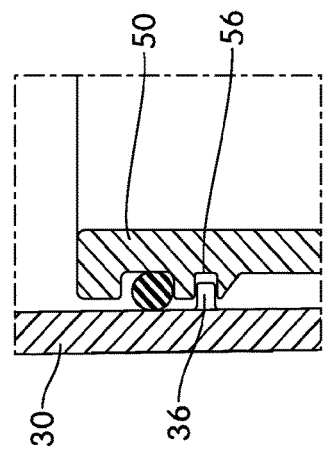
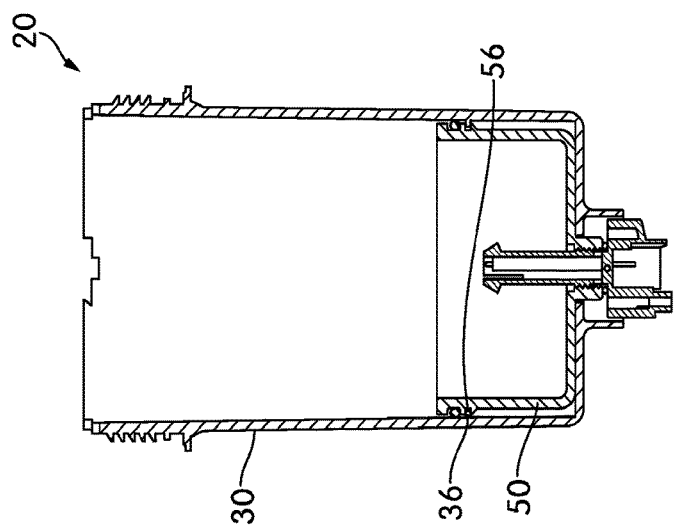

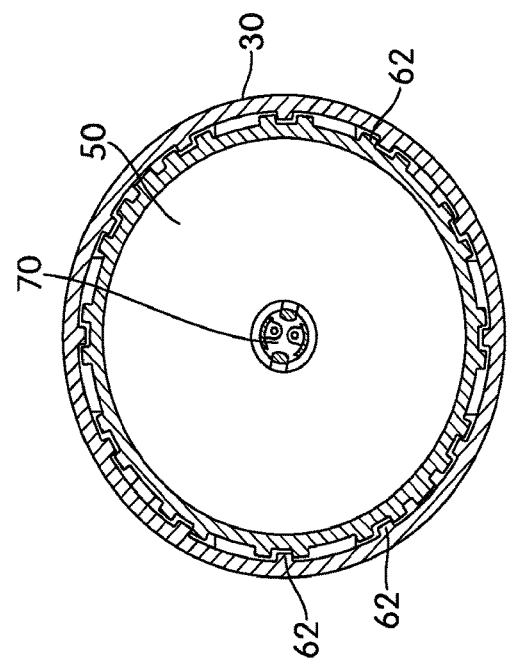
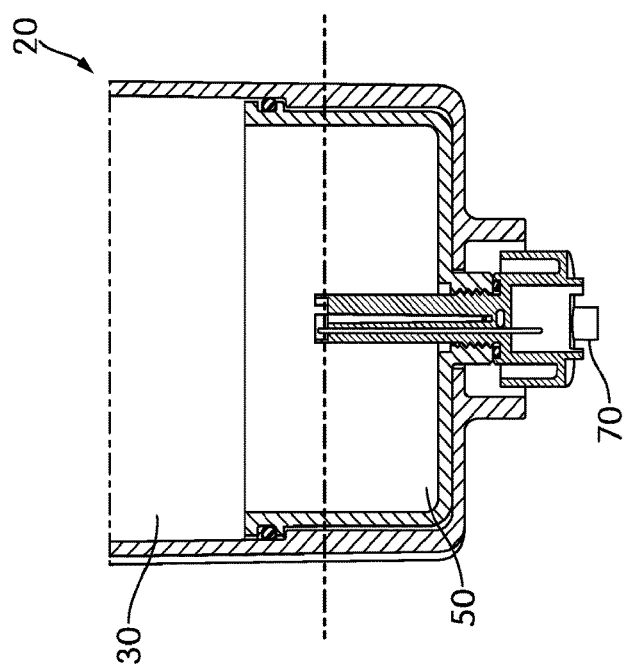
FIG. 8B
FIG. 8A

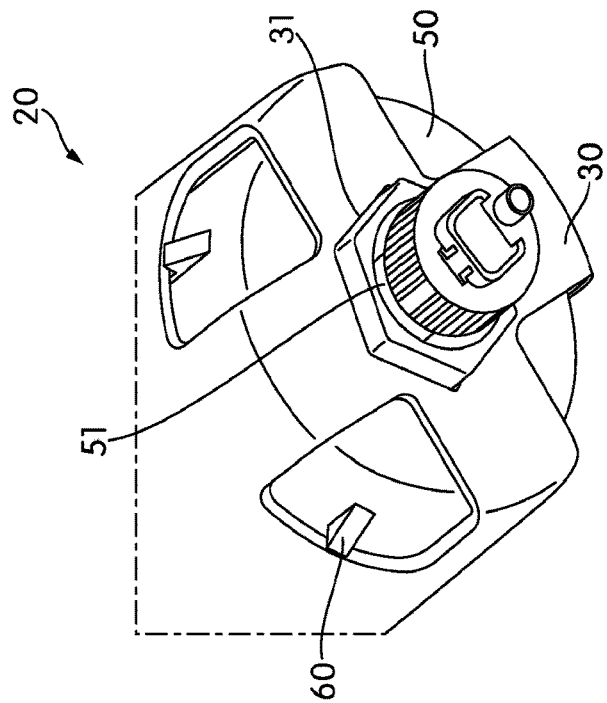
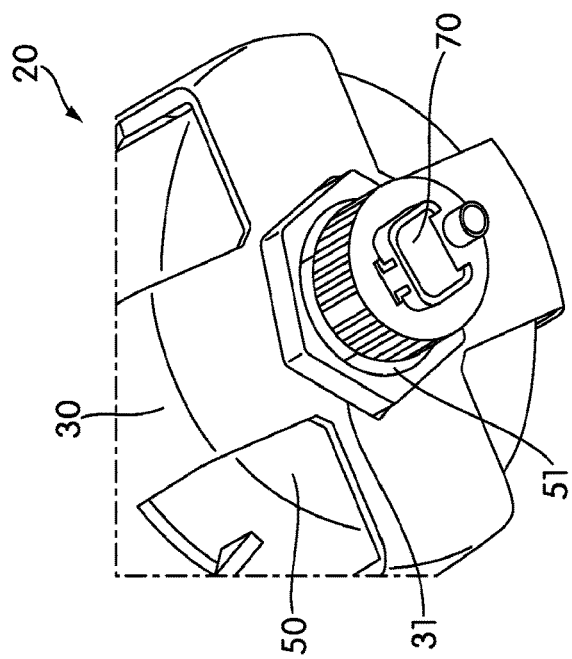

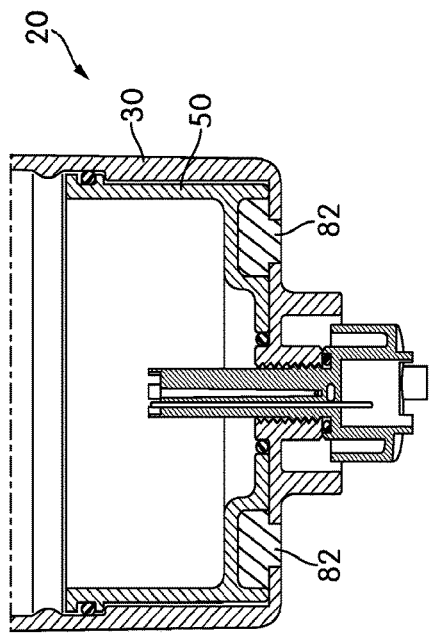
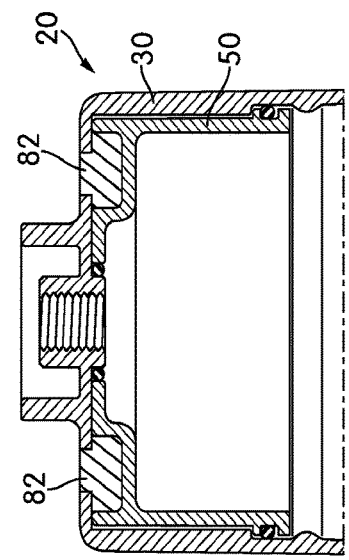
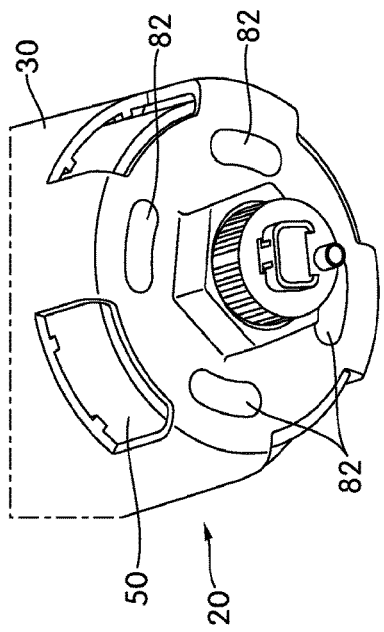
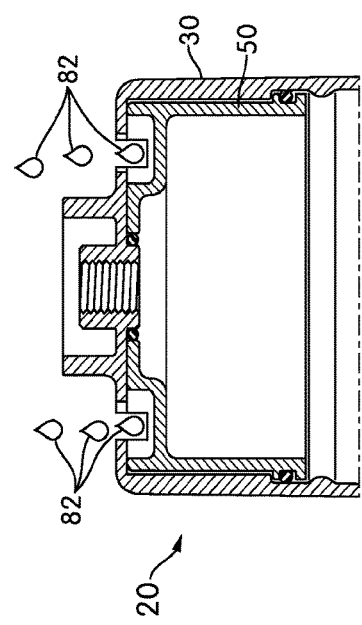
FIG. 12A
FIG. 12B
FIG. 12C
FIG. 12D

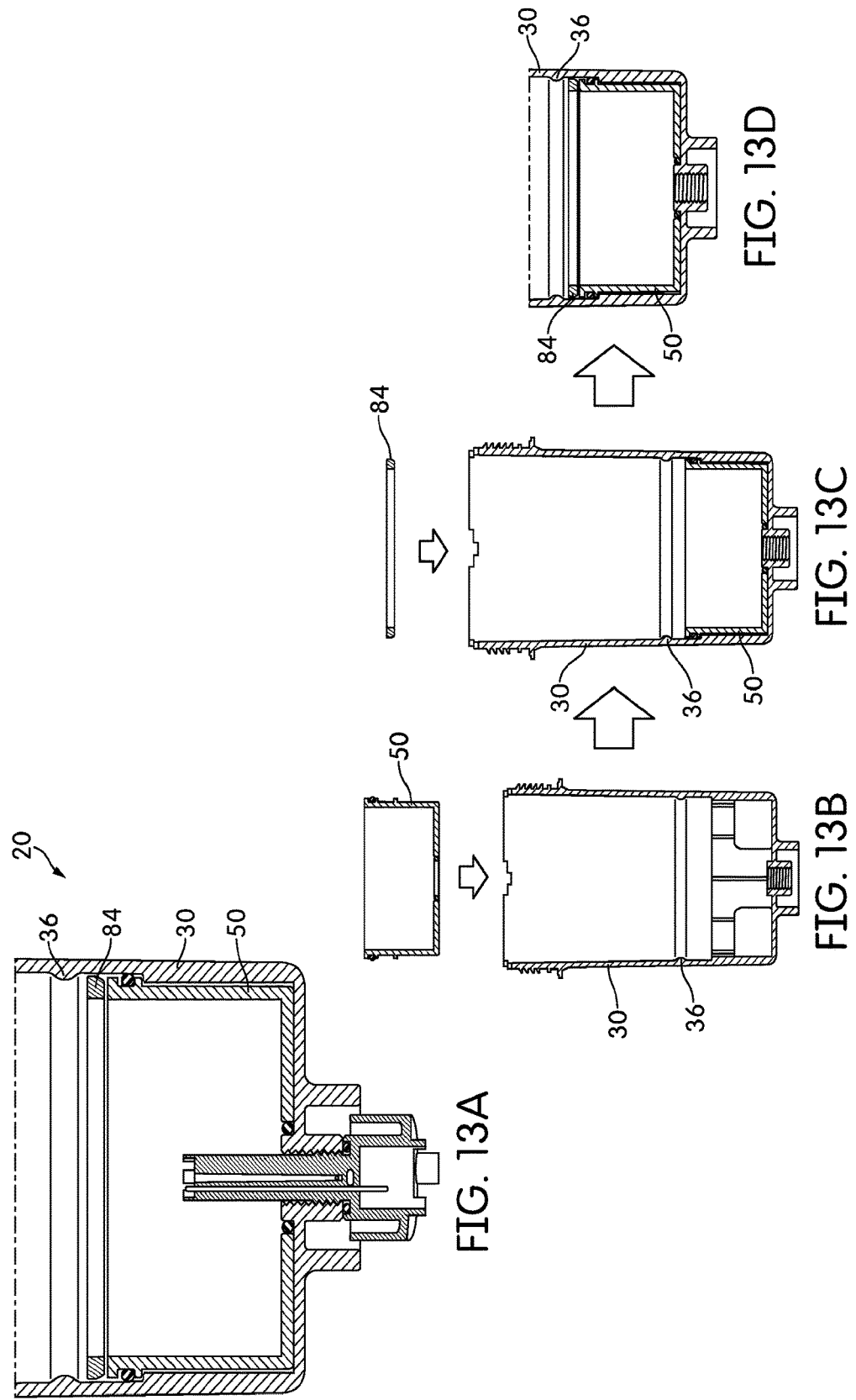

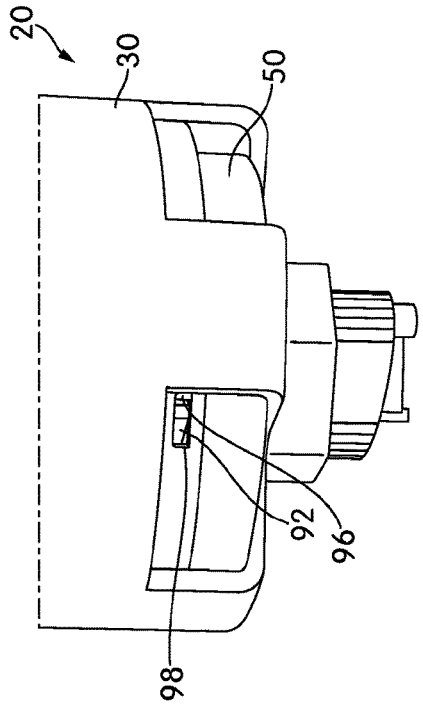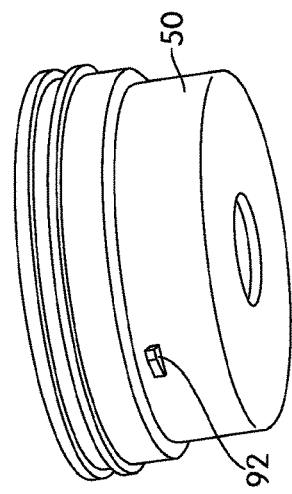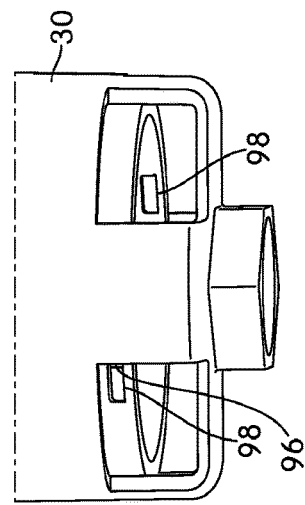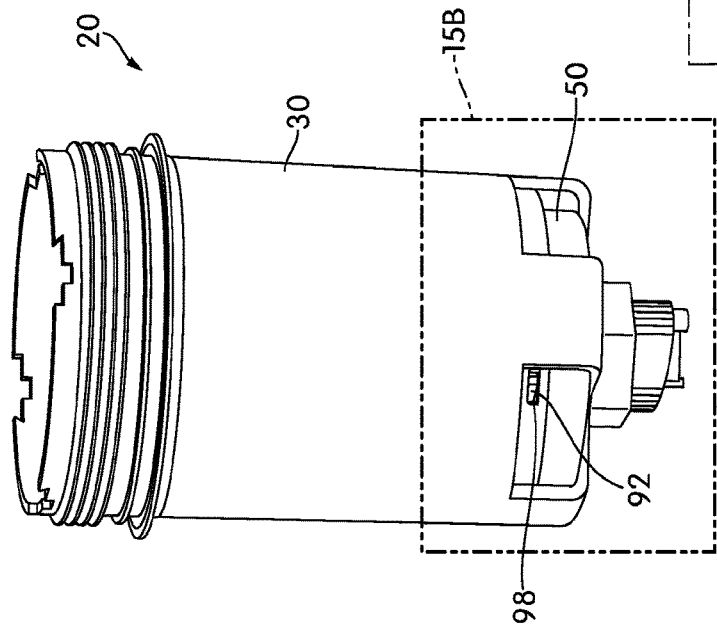

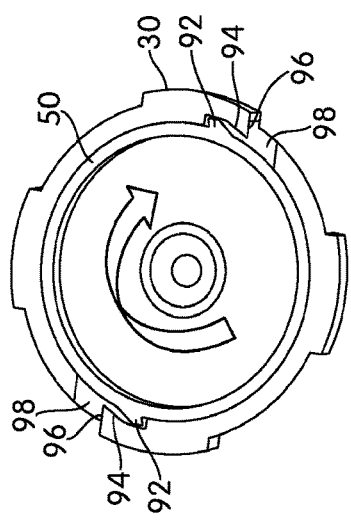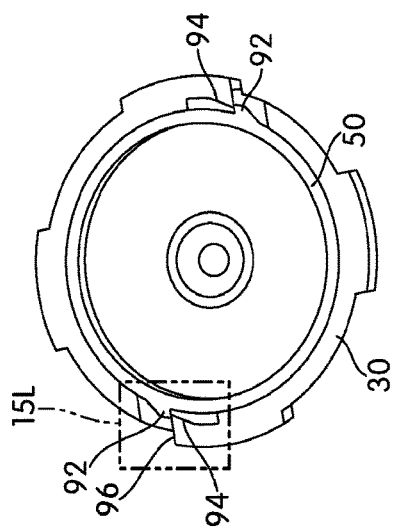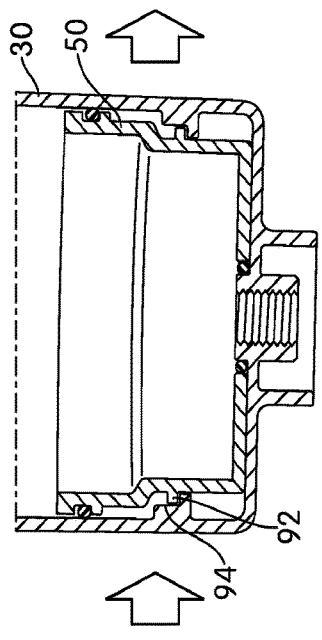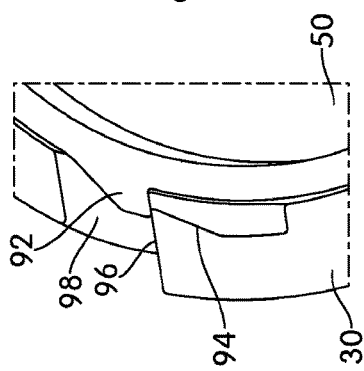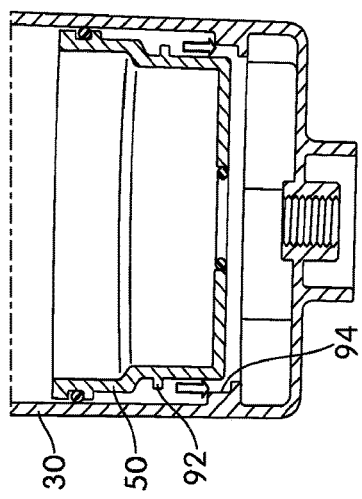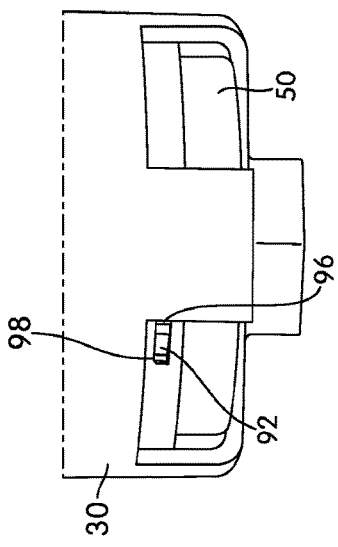

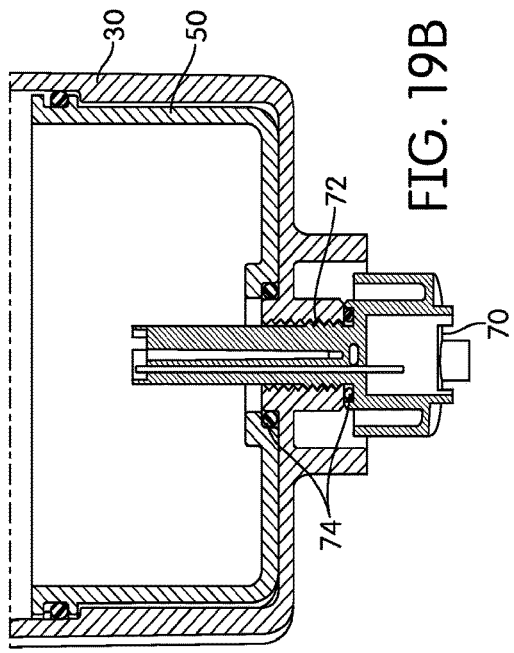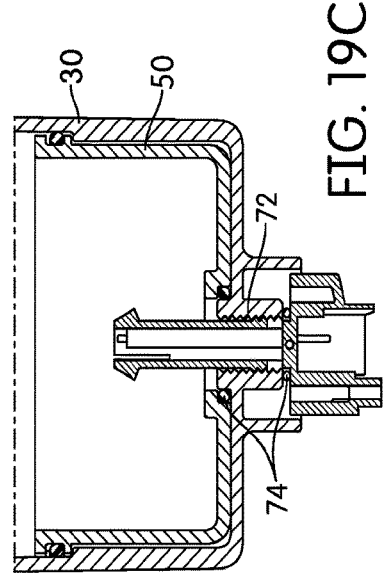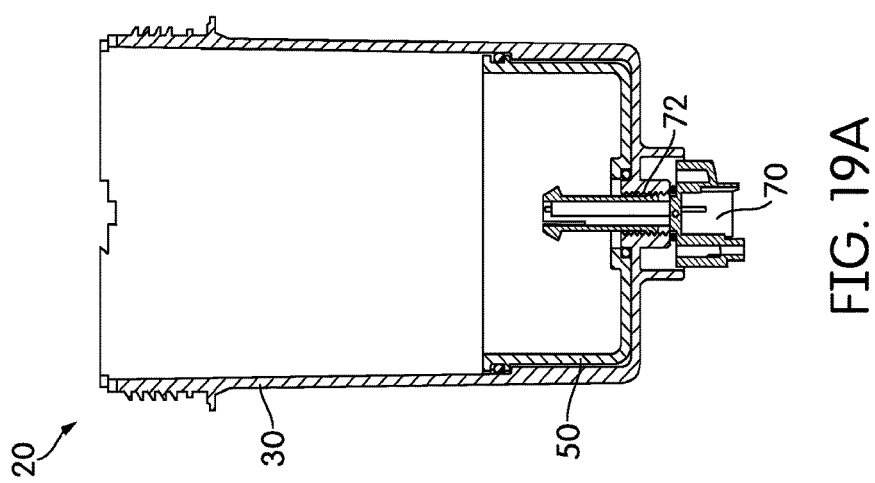

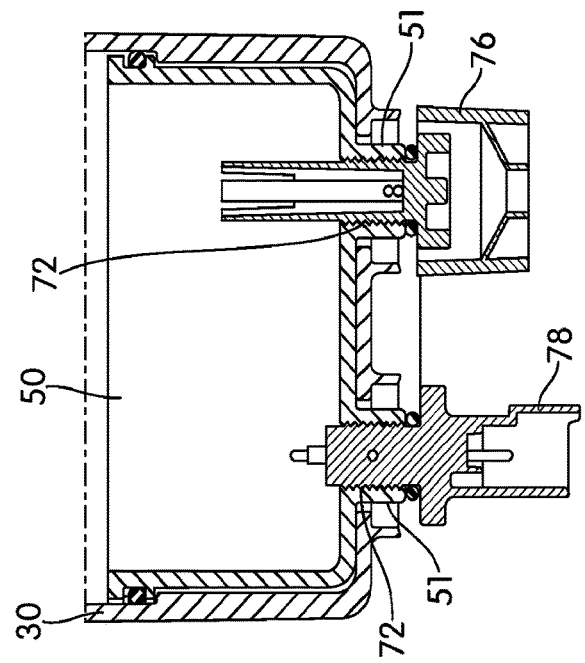
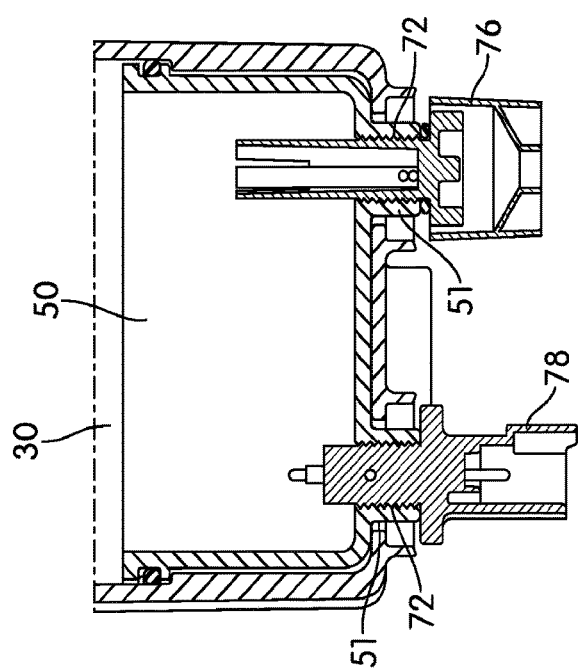
FIG. 20A
FIG. 20B

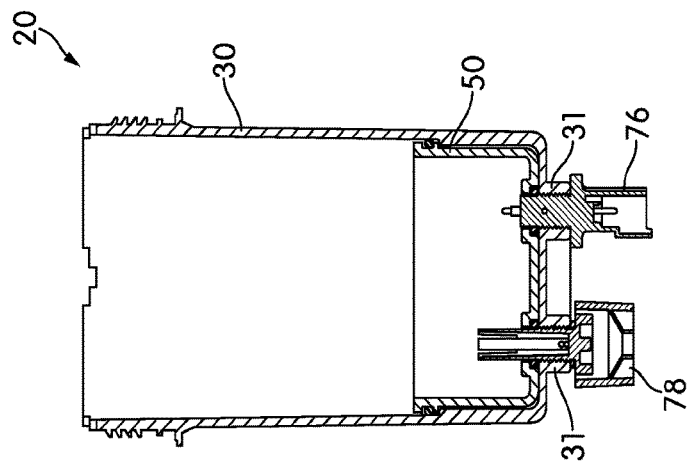
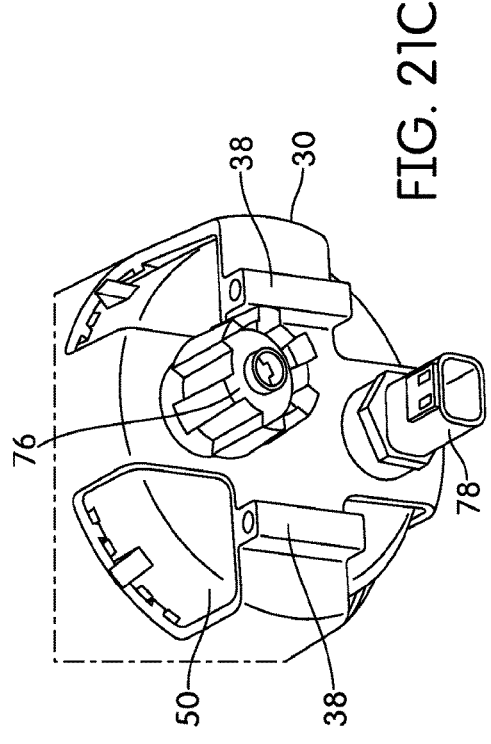
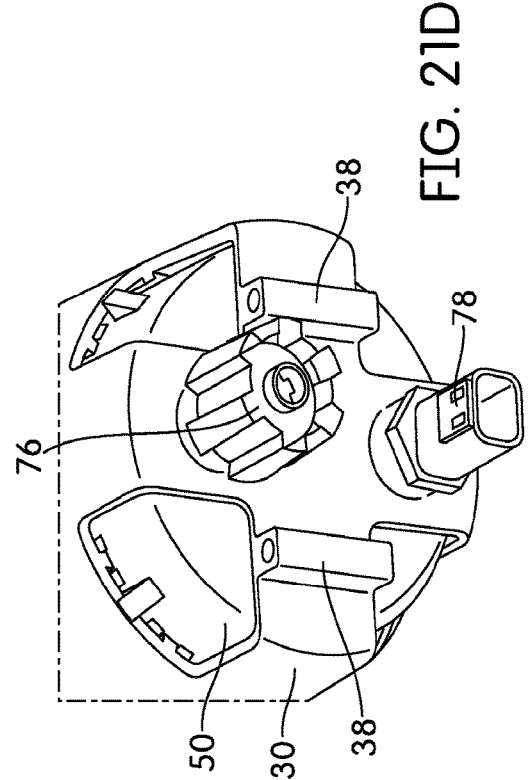
FIG. 21C
FIG. 21D
FIG. 21E

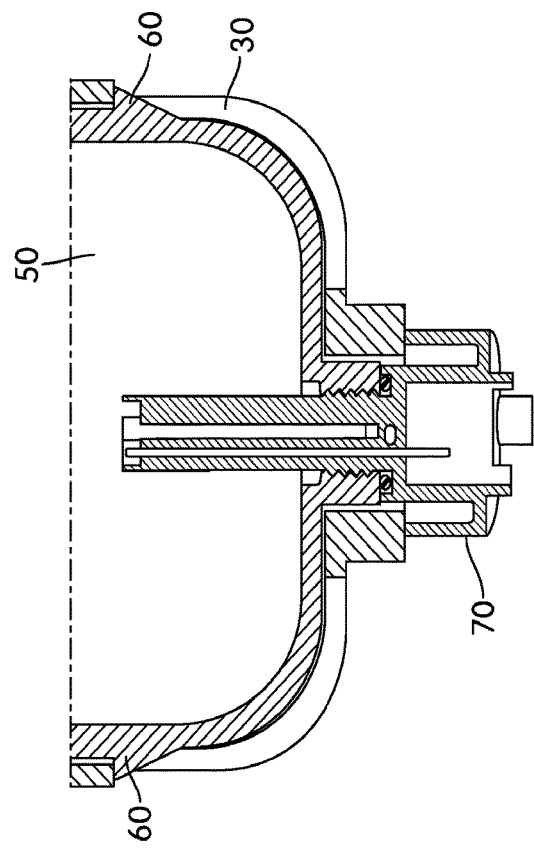
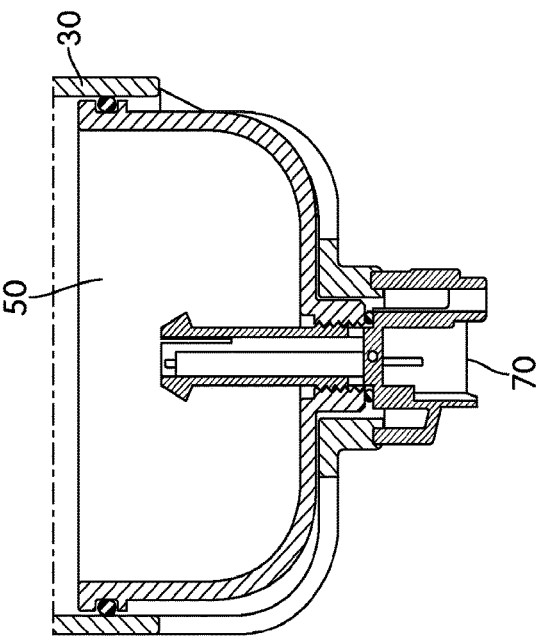
FIG. 22A
FIG. 22B

FILTER MODULE WITH WINDOW TYPE CLEAR BOWL

CROSS-REFERENCE TO RELATED APPLICATIONS

This Application is a U.S. national stage application claiming the benefit of International Application No. PCT/US2015/25653, filed on Apr. 14, 2015, which claims priority to and the benefit of India Provisional Patent Application No. 2015/CHE/2014, filed on Apr. 18, 2014. The contents of both applications are incorporated herein by reference in their entirety.

TECHNICAL FIELD

The present application relates to filters.

BACKGROUND

Typically, current fuel filters or other suction side filters with clear bowls in a dome-shaped design fail due to the gasket blowing due to applied pressure, and failure could also at a threaded connection between the clear bowl and the fuel filter shell. The threaded connection and the gasket are typically the weakest links within fuel filters and suction side filters and may result in device failure. As a result, the filter may fail with low burst and fatigue pressure during testing and/or use. Further, due to high temperatures, the filter material may creep and/or deform, which may allow outside air to enter into the filter system.

It is also noted that, due to the design of the current fuel filters, the clear bowl may directly interface with the servicing operations. For example, a HEX feature may be located directly on the clear bowl to allow the fuel filter to be installed and/or removed. However, since it may be difficult or cumbersome to remove the clear bowl from the fuel filter shell in order to properly service the filter, the filter must be removed from the system being filtered and held in a vice in order to remove the clear bowl from the filter shell. Due to the relative fragility and the brittleness of the clear bowls (which may be constructed out of, for example, a clear, amorphous polymer, which may be more brittle than conventional plastic), the clear bowl within the fuel filter shell may fracture or break while the fuel filter is being serviced due to, for example, torque applied to the clear bowl.

The threaded connection between the clear bowl and the fuel filter shell may also result in confusion during the servicing events. For example, the clear bowl may be over- or under-torqued while the fuel filter is being serviced or while the clear bowl is being removed, potentially resulting in device failure or leakage. Device failure may result in air being sucked into the fuel system. Excessive air in the fuel system may negatively impact the efficiency and performance of the engine. Additionally, the design of certain fuel filters with clear bowl may increase the overall height of the fuel filter, thereby affecting the packaging space and clearances relative to adjacent system components. This also has the potential to result in failure and/or degraded performance of the fuel filter system.

SUMMARY

Various embodiments provide for a fuel filter including a shell with at least one viewing region, a translucent bowl that fits and is installable within the shell, and an attachment mechanism. The bowl is positionable within the shell such that at least a portion of the bowl is visible through the viewing region. The attachment mechanism securely attaches the bowl and the shell together and prevents at least one of vertical and rotational movement between the bowl and the shell. The shell and the bowl are not threaded to each other.

Various other embodiments provide for a method of assembling a filter assembly. The method includes inserting a translucent bowl into a shell such that at least a portion of the bowl is visible through at least one viewing region of the shell and securing the bowl and the shell together with an attachment mechanism such that at least one of vertical and rotational movement between the bowl and the shell is prevented. The shell and the bowl are not threaded to each other.

These and other features (including, but not limited to, retaining features and/or viewing features), together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

FIG. 1A is a front view of a fuel filter according to one embodiment.

FIG. 1B is a cross-sectional view of a shell and a bowl that can be disposed within the fuel filter of FIG. 1A.

FIG. 2A is a perspective, partial breakaway view of a fuel filter according to one embodiment.

FIG. 2B is a cross-sectional, partial breakaway view of a shell and a bowl that can be disposed within the fuel filter of FIG. 2A.

FIGS. 3A-3E are sequential, cut-away views of a bowl being placed into a shell of a fuel filter, according to one embodiment.

FIGS. 4A and 4B are front and cross-sectional views, respectively, of a fuel filter with snaps according to one embodiment.

FIGS. 5A-5F are bottom perspective, close-up, front close-up, front, right perspective, and left perspective views of a fuel filter according to one embodiment.

FIGS. 6A-6C are cross-sectional views of a fuel filter according to one embodiment.

FIGS. 7A-7E are cross-sectional views of a fuel filter according to one embodiment.

FIG. 8A is a cross-sectional view of the fuel filter of FIG. 1A with a shell and a bowl; FIG. 8B is a top view of the cross-section of the fuel filter of FIG. 8A.

FIGS. 11A and 11B are perspective bottom views of a fuel filter according to yet another embodiment.

FIG. 12A is a perspective bottom view of a fuel filter according to another embodiment.

FIG. 12B is a cross-sectional view of the fuel filter of FIG. 12A.

FIGS. 12C-12D are cross-sectional views of the fuel filter of FIG. 12A with an adhesive material being added.

FIG. 13A is a cross-sectional view of a fuel filter according to yet another embodiment.

FIGS. 13B-13D are cross-sectional views of the fuel filter of FIG. 13A being assembled.

FIG. 15A is a perspective view of a fuel filter according to yet another embodiment.

FIG. 15B is an enlarged view of Section 15B in FIG. 15A.

FIGS. 15C-15D are perspective views of the shell and the bowl, respectively, of the fuel filter of FIG. 15A.

FIGS. 15H-15M are views of the fuel filter of FIG. 15A being assembled, where FIGS. 15H-15I are side, cross-sectional views, FIGS. 15J-15K are top, cross-sectional views, FIG. 15L is an enlarged view of Section 15L of FIG. 15K, and FIG. 15M is a perspective view.

FIGS. 19A-19E are cross-sectional front views of a fuel filter according to yet another embodiment.

FIGS. 20A-20E are cross-sectional front views and perspective views of a fuel filter according to one embodiment.

FIGS. 21A-21E are cross-sectional front views and perspective views of a fuel filter according to another embodiment.

FIGS. 22A-22C are cross-sectional front views of a fuel filter according to one embodiment.

DETAILED DESCRIPTION OF VARIOUS EMBODIMENTS

Figure 5F:
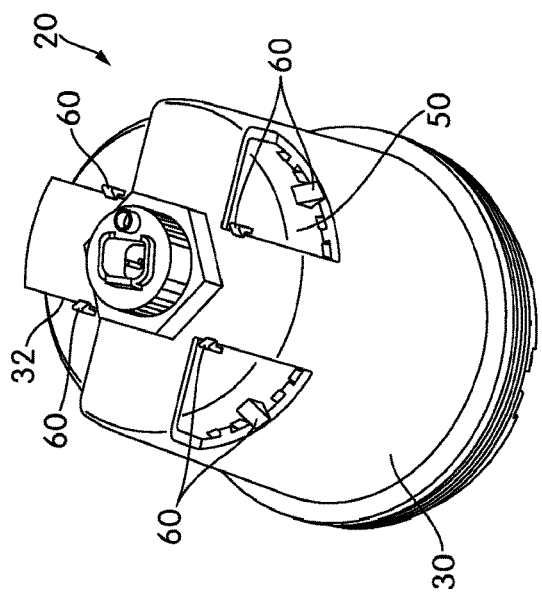

Referring to the figures generally, the various embodiments disclosed herein relate to a fuel filter assembly with at least one window along a filter shell and a transparent, translucent, clear bowl within the shell. The bowl may be held within or attached to the shell through a variety of different mechanisms as discussed further herein and may not require a threaded connection between the shell and the bowl, thereby improving the strength and resilience of the fuel filter assembly. More specifically, the mechanisms described herein may prevent device failure or leakage due to creep (which may be due to a variety of factors, including, but not limited to, fluid mass and temperature). Further, the mechanisms described herein may allow the filter to be more easily serviced. The fuel filter may be used as, for example, a filter water separator (FWS) and may be used to filter and/or separate a variety of different liquids, including but not limited to water and fuel. The fuel filter may be used with a variety of different filters, including but not limited to spin-ons and cartridge-type filters.

The Fuel Filter

Referring now to FIG. 1, there is shown a fuel filter assembly 20 according to one embodiment. Although a fuel filter is referred to at various locations herein, it is understood that the fuel filter 20 may not be limited to fuel, but may be used with other fluids, and more particularly other liquids. For example, the fuel filter 20 may be used with lube. Further, the fuel filter 20 may alternatively function as different types of filters, including but not limited to suction side filters.

The fuel filter 20 includes a housing or shell 30 and a bowl 50. The shell 30 may be used to house, protect, and/or secure the bowl 50 when the bowl 50 is installed within the shell 30. The shell 30 may include at least one hole, viewing region, open space, opening, or window 32 to allow at least a portion of the bowl 50 to be visible outside of the shell 30 through the window 32. (Although the window 32 may be considered a type of viewing region, a "window" is referred to herein for ease of understanding. It is understood, however, that a generic viewing region may be used.) Due to the transparency of the bowl 50, the inside of the bowl 50 may also be visible such that, for example, a user may see the level of fluid within the fuel filter 20 from the outside (e.g., through the window 32 of the shell 30 and through a wall of the bowl 50). The bowl 50 may be secured within the shell 30 through a variety of different mechanisms, as described further herein. The bowl 50 and the shell 30 may be used congruently to hold, house, or store various liquids, such as water and/or fuel. The water may be, for example, water that has been separated from fuel through a FWS.

The shell 30 may be shaped according to the desired configuration, shape, material and manufacturing process, and use of the fuel filter 20. For example, as shown in FIGS. 1A and 2A, the shell 30 may be substantially cylindrical with an inner hollow portion. The ends of the shell 30 may be substantially flat, curved or domed. At least one end of the shell 30 may be open (as shown in FIG. 2A) and may further attach with a lid or cap to close off the open end. Although the inner hollow portion of the shell 30 may mimic the shape of the outside of the shell 30, it is understood that the inner hollow portion and the outside of the shell 30 may be shaped differently.

Figure 8D:
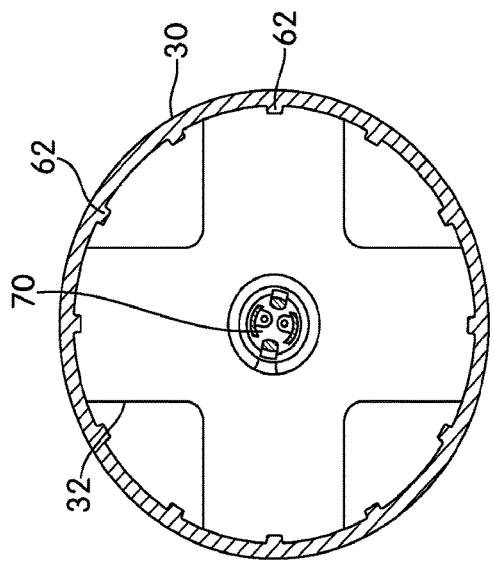
FIGS. 8C-8E are perspective and top views of the cross-section of the shell of FIG. 8A.
Figure 8E:
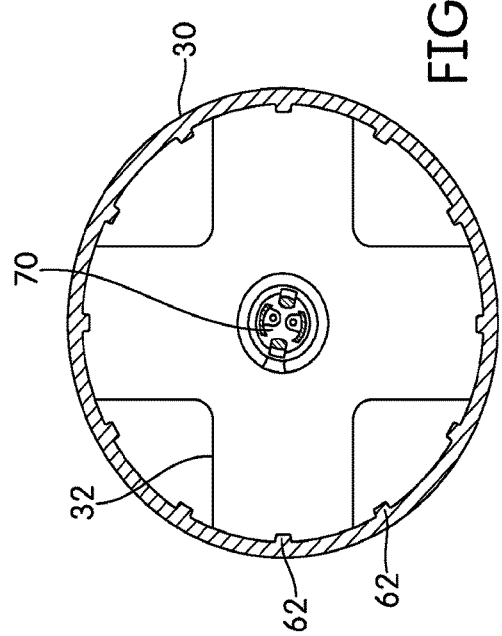
Figure 8C:
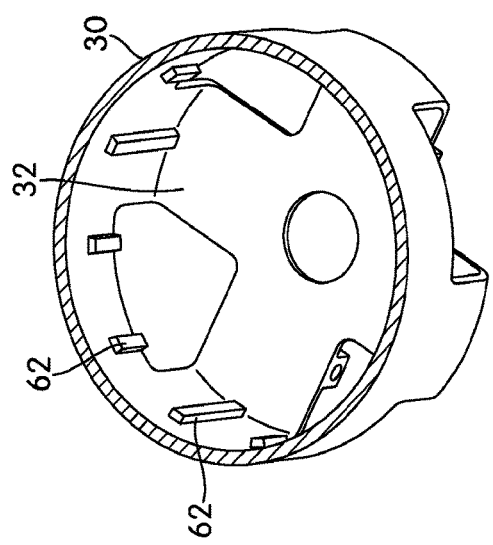
Figure 8H:
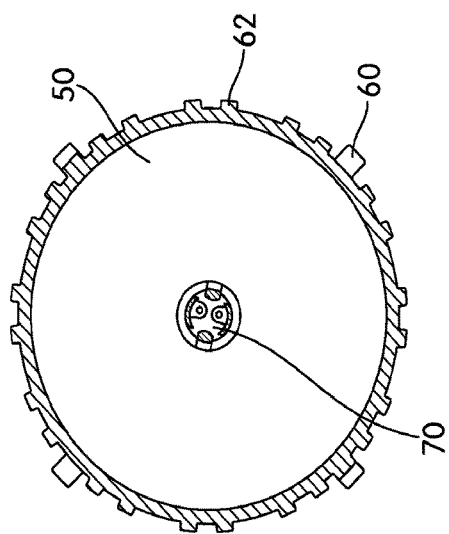
FIGS. 8F-8I are perspective and top views of the cross-section of the bowl of FIG. 8A.
Figure 8I:
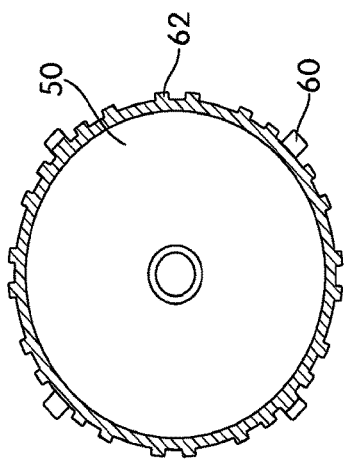
Figure 8F:
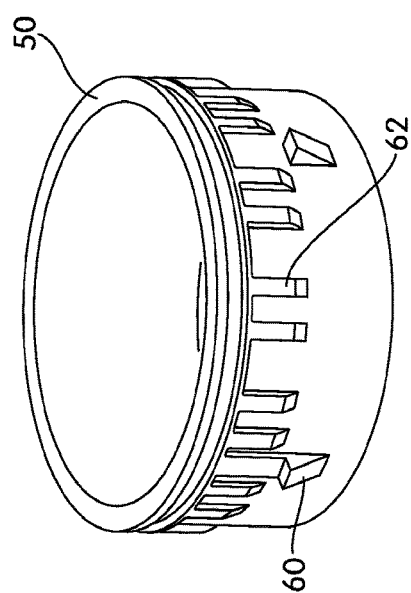
Figure 8G:
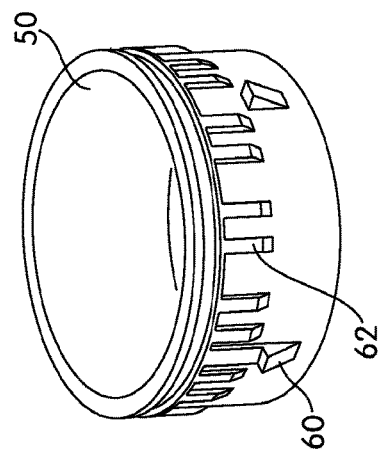

The shell 30 may have at least one window 32 along at least a portion or surface of the shell 30 and may be formed into a wall of the shell 30. For example, as shown in FIGS. 1A and 2A, the windows 32 are located along a lower portion of the shell 30. The windows 32 may be shaped and sized according to the desired configuration. As shown in FIGS. 1A and 2A, the windows 32 may be substantially rectangular along the surface of the shell 30. However, the windows 32 may have circular, oval, elliptical, or triangular shape. The number of windows 32 may also vary according to the desired configuration. As shown in FIGS. 8C-8E, the shell 30 may have four windows spaced evenly along the perimeter of the shell 30. The windows 32 may at least partially extend along a portion of the vertical height of the shell 30, as well as at least partially along at least one lower, horizontal end of the shell 30, as shown in FIGS. 5A, 5E, and 8C, such that the window 32 extends along a "corner" of the shell 30.

The bowl 50 is configured to be at least partially housed, held, or supported within the shell 30. At least a portion of the bowl 50 may be visible through the windows 32. The bowl 50 may further be constructed out of a transparent, clear, or translucent material to allow the user to see the inside of the bowl 50 and the liquid level (e.g. the water volume) within the fuel filter 20. The fuel filter 20 may utilize a conventional bowl 50 or may use a customized bowl 50 to fit with the shell 30. Although the figures show that the bowl 50 may be secured within the shell 30, it is understood that the bowl 50 may be secured to or around an outside portion of the shell 30.

The bowl 50 may be shaped according to the desired configuration and at least partially fit within the shell 30 (and, thus, may at least partially complement or mimic the shape of the inside or inner hollow portion of the shell 30). For example, and as shown in FIGS. 1B and 2B, the bowl 50 may have, for example, a dome, rectangular, or cylindrical shape. As further discussed herein, the bowl 50 and the shell 30 may be in an oval shape, as shown in FIGS. 22A-22E. The bowl 50 may be shaped such that the bowl 50 may fit concentrically within the shell 30.

As shown in FIGS. 1B and 2B, an o-ring 52 may be positioned between the bowl 50 and the shell 30 to secure the bowl 50 in place within the shell 30 and to prevent or minimize movement between the bowl 50 and the shell 30. The o-ring 52 may optionally provide a fluid seal between the bowl 50 and the shell 30, preventing the fuel filter 20 from leaking. The o-ring 52 may be made out of a variety of materials, including, but not limited to, rubber. The seal between the bowl 50 and the shell 30 may be formed independently from the cartridge design or any cartridge servicing. Alternatively or additionally, a hermetic seal may be formed between the bowl 50 and the shell 30 with spin welding.

Attachment Mechanism Between the Shell and the Bowl 50

The shell 30 may support and attach with the bowl 50 in such a way as to prevent vibrations and to securely hold the bowl 50. Although a variety of different mechanisms may be used to secure the shell 30 within the bowl 50, the shell 30 and the bowl 50 may not require or have a threaded attachment or interface. As mentioned previously, threaded attachments between the shell 30 and the bowl 50 may dramatically weaken the connection between the shell 30 and the bowl 50 and are highly prone to failure (such as, for example, burst and fatigue failure). Therefore, eliminating the need for a threaded attachment between the shell 30 and the bowl 50 may increase the overall strength, robustness, and durability of the fuel filter 20. Further, the mechanisms and designs described herein may be used in high or low pressure applications. Therefore, the elimination of the need for a threaded attachment may also prevent external air from leaking into the fuel system due to fluid loading and temperature creep.

Since the shell 30 and the bowl 50 do not require a threaded attachment therebetween, servicing the fuel filter 20 may be easier, less confusing, and less prone to device failure. For example, since the bowl 50 does not have to be screwed into the shell 30, the bowl 50 will not be over- or under-torqued into the shell 30 during servicing, thereby minimizing the potential of damaging any part of the fuel filter 20.

The bowl 50 and the shell 30 may be integral or may be two separate pieces (temporarily or permanently attached). According to one embodiment, the bowl 50 may be insert molded into the shell 30. The bowl 50 may be attachable to, detachable from, and reattachable to the shell 30 (which may be particularly useful in order to, for example, service the filter 20). Alternatively or additionally, the bowl 50 may be spin welded into the shell 30.

According to one embodiment as shown in FIGS. 3A-3E, in order to install the bowl 50 into the shell 30, the bowl 50 is inserted or slide into the shell 30 during assembly to assemble at least a portion of the fuel filter 20. The bowl 50 is inserted through a top opening of the shell 30 (as shown in FIGS. 3A and 3B) and moved at least partially along the length (in, for example, the vertical direction) of the shell 30 to a bottom portion of the shell 30, such that an opening, aperture, drain port, or bowl spout 51 of the bowl 50 is at least partially aligned with or fits within an opening, aperture, drain port, or shell spout 31 (as shown in FIG. 3C) such that an inner region of the bowl is accessible through the shell spout 31 and the bowl spout 51. Since the bowl 50 and the shell 30 do not have a threaded attachment therebetween, the bowl 50 do not need to be rotated relative to the shell 30 during assembly.

According to one embodiment, and as shown in FIGS. 3D-3E, once the shell 30 and the bowl 50 are aligned and fit together, a WIF (water-in-fuel) sensor and drain valve combination 70 is added to the configuration (as shown in FIG. 3D) and fits or is secured at least partially within the shell spout 31 and/or the bowl spout 51 to create one embodiment of the final assembly of the fuel filter 20 (as shown in FIG. 3E). The drain valve and the WIF sensor, however, may be located separately (as described herein) or the fuel filter 20 may only include one of the drain valve and the WIF sensor. The WIF-drain 70 may attach to the shell 30 and/or the bowl 50 through a variety of different mechanisms, as discussed later. The WIF-drain 70 may further reinforce the connection or attachment between the shell 30 and the bowl 50 by connecting the shell 30 and bowl 50 together with, for example, a threaded attachment with at least one of the shell 30 and the bowl 50. For example, the WIF-drain 70 may have a threaded attachment with the shell 30 and may function as a stopper with the bowl 50, thereby holding the shell 30 and the bowl 50 together. Due to the various attachment mechanisms, however, the fuel filter 20 may not require extra parts or components to lock the bowl 50 to the shell 30. Therefore, in arrangements with the WIF-drain attachment, the overall filter length may be reduced, thereby reducing the size of the required packaging.

In order to prevent the bowl 50 from moving vertically (along the y-axis of the fuel filter, as shown in FIG. 1) and/or rotationally along or within the shell 30 and to further secure, interlock, or attach the shell 30 and the bowl 50 together when the bowl 50 is installed in the shell 30, the shell 30 and/or bowl 50 may include a variety of additional attachment mechanisms. As described further herein, the attachment mechanisms may include, but are not limited to, snaps 60, an abutment 36, vertical ribs 62, a protrusion 58, complementary geometry of the shell spout 31 and the bowl spout 51, an adhesive material 82, an extra securing feature (e.g., a securing ring 84 or a securing clip 86), and horizontal snaps 92. It is understood that the various attachment mechanisms may be used individually or in conjunction with other attachment mechanisms.

According to one embodiment as shown in FIGS. 4A and 4B, the outer surface or sides of the bowl 50 have at least one snap 60 (such as a snap fit joint) to attach to the shell 30, thereby preventing any vertical movement between the bowl 50 and the shell 30. The snaps 60 may be located on the shell 30 and/or the bowl 50. The snaps 60 are aligned, spaced, and sized such that the snaps 60 at least partially protrude out of the windows 32 and hook at least partially around or lock to a portion of the shell 30, such as an inner edge of a window 32. As shown in FIG. 4B, the snaps 60 extend from the outside of the bowl 50 and include a top horizontal portion and an upwardly angled portion such that the bowl 50 may slide into and along the length of the shell 30 (and the side of the bowl 50 may at least partially flex inward to fit within the shell 30) toward the windows 32. Once the bowl 50 reaches the windows 32, the snaps 60 (and the sides of the bowl 50) move outward within the windows 32 and the horizontal portions of the snaps 60 press against an inner perimeter of the windows or an outside portion of the shell 30, locking the bowl 50 to the shell 30. The snaps 60 may further prevent the bowl 50 from moving or being dislodged within the shell 30 under suction or pressure. Alternatively or additionally, the snaps 60 may include a spring or other biasing element to further reinforce the attachment between the bowl 50 and the shell 30.

Figure 5E:
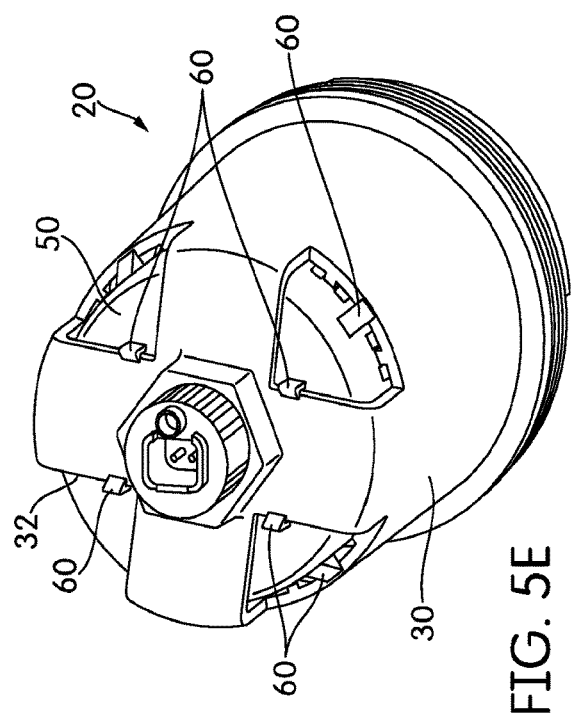
Figure 5D:
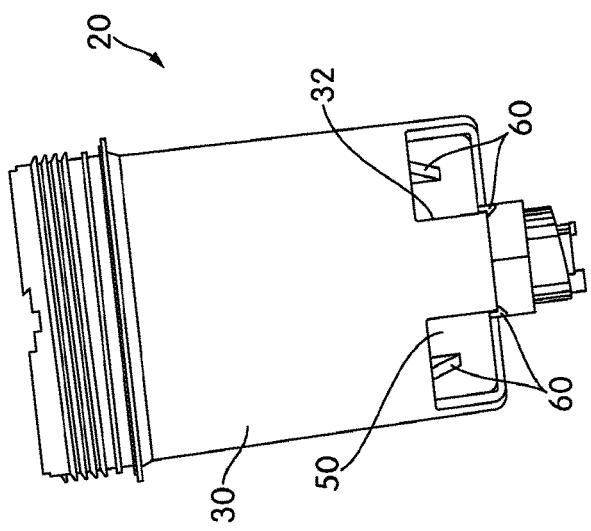

Alternatively or additionally, according to another embodiment as shown in FIGS. 5A-5F, the snaps 60 are also located on the end of the bowl 50 and also extend through a lower portion of the windows 32. The snaps 60 on the end of the bowl 50 are configured to attach at least partially to the lower or bottom end of the shell 30. The type of snap 60 may vary depending on the desired security. For example, as shown in FIG. 5B, the snaps 60 at least partially latch or hook around a portion of the shell 30. The number and positioning of the snaps 60 may vary depending on the desired configuration and degree of attachment. FIGS. 5A, 5E, and 5F depict four snaps 60 on the sides of the bowl 50 and four snaps 60 on the end of the bowl 50.

In addition to preventing relative vertical movement, it is also understood that the snaps 60 may also be used to prevent the bowl 50 from rotating relative to the shell 30 (in addition to or separate from the other attachment or securing features described here). For example, the snaps 60 may be positioned on the bowl 50 such that the snaps 60 interlock with at least the vertical sides of the windows 32.

According to another embodiment as shown in FIGS. 6A-6C and 7A-7E, the relative geometry of the shell 30 and the bowl 50 may allow the components of the fuel filter 20 to lock or attach to each other (and may not require additional components or locking mechanisms). For example, the shell 30 includes a horizontal protrusion, lip, projection, bump, or abutment 36 around at least a portion of the inner horizontal perimeter of the shell 30. The abutment 36 may circumvent the entire inner perimeter of the shell 30 (as shown in FIG. 6A) or a small portion of the inner perimeter of the shell 30. Optionally, there may be multiple abutments 36 along the inner perimeter of the shell 30, each correlated to the height of the bowl 50.

The abutment 36 may be located at any height or position within the inside of the shell 30. As shown in FIGS. 6A-6C, the distance between the abutment 36 and the bottom of the shell 30 is slightly more than the height of the bowl 50, such that the bowl 50 fits, snaps, and is secured between the abutment 36 and the bottom of the shell 30. The abutment 36 may protrude from the inner wall of the shell 30 to a variety of different distances depending on the desired configuration, the desired degree of locking between the shell 30 and the bowl 50, and the thickness of the walls of the bowl 50. For example, the abutment 36 may extend over a portion of the width of the wall of the bowl 50 when the bowl 50 is installed, such that the bowl 50 is secured in the shell 30 and cannot move vertically within the shell 30, but the functionality of the filter 20 is not altered due to the abutment 36.

Figure 7B:
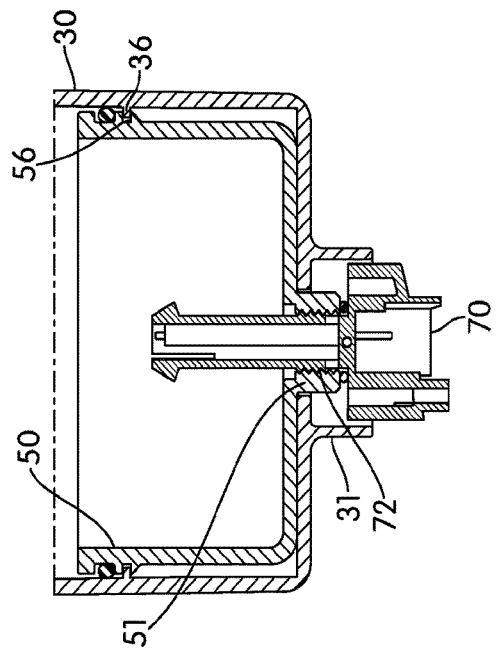
Figure 7A:
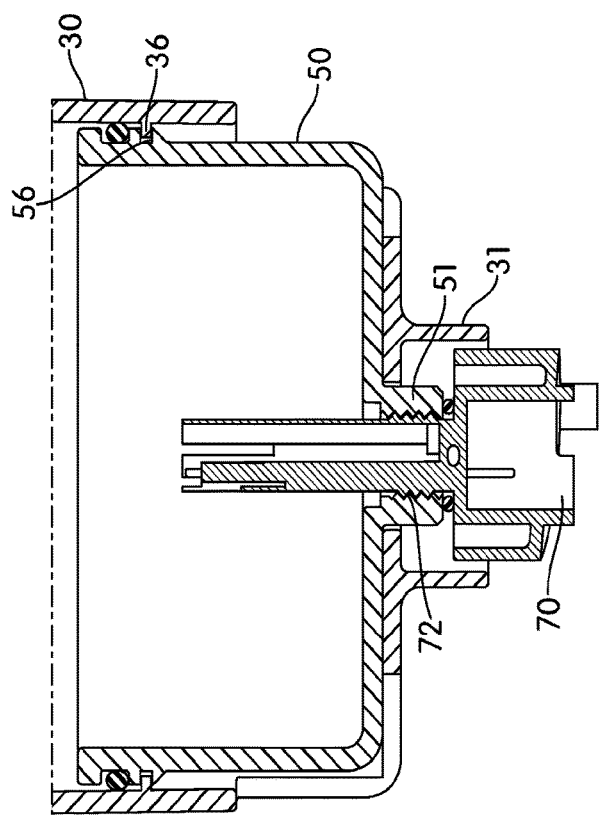

Alternatively or additionally, and as shown in FIGS. 7A-7E, the abutment 36 may be positioned within the shell 30 such that the distance between the abutment 36 and the bottom of the shell 30 is less than the height of the bowl 50. The abutment 36 further corresponds with the geometry of the bowl. For example, the bowl 50 has a horizontal lip, slot, or indentation 56 (or, for example, two bumps creating an indentation therebetween), which has complementary to the geometry of the abutment 36. The indentation 56 may extend from an outer surface of the bowl and the height of the indentation 56 along the bowl 50 corresponds to the height of the abutment 36 within the shell 30 (e.g., the distance between the abutment 36 and the bottom surface of the shell 30 that the bowl 50 rests on when installed in the shell 30). The indentation 56 snaps at least partially around or over or locks to the abutment 36 when the bowl 50 is installed within the shell 30. As shown in FIGS. 7D and 7E, the abutment 36 is at least partially be secured within the indentation 56, thereby securing the bowl 50 and the shell 30 together along the length of the shell 30. It is understood, however, that the shell 30 may include more than one indentation 56 and the bowl 50 may include more than one abutment 36.

Alternatively or additionally according to another embodiment as shown in FIGS. 8A-8I and in order to further secure or lock the bowl 50 within the shell 30 and prevent rotational movement of the bowl 50 (in particular, while draining or operating the fuel filter 20), the bowl 50 and/or the shell 30 includes at least one guiding or interlocking vertical protrusion, slot, socket, protruded feature, hex feature, snap, bump feature, or rib 62. The ribs 62 extend along the vertical direction and extend from the inner portion or surface of the shell 30 and/or the outer portion or surface of the bowl 50. A plurality of or multiple ribs 62 are spaced intermittently around the inside and outside perimeters of the shell 30 and the bowl 50 (respectively), though it is understood that the shell 30 and/or the bowl 50 may have one rib 62. The size and shape of the ribs 62 on the shell 30 and the bowl 50 are complementary such that the ribs 62 may slide and interlock with each other when the bowl 50 is installed in the shell 30, thus preventing relative rotational movement. Coupled with the snaps 60 and/or the abutment 36, the bowl 50 is configured to be completely secured and/or locked along the vertical axis of the shell 30, as well along the horizontal and lateral axes (e.g. in a rotational direction within the shell 30). According to one embodiment, the ribs 62 may be positioned to lock the shell 30 and bowl 50 together, with only a single specific or particular tool needing to be used in order to detach the shell 30 and the bowl 50.

Figure 9B:
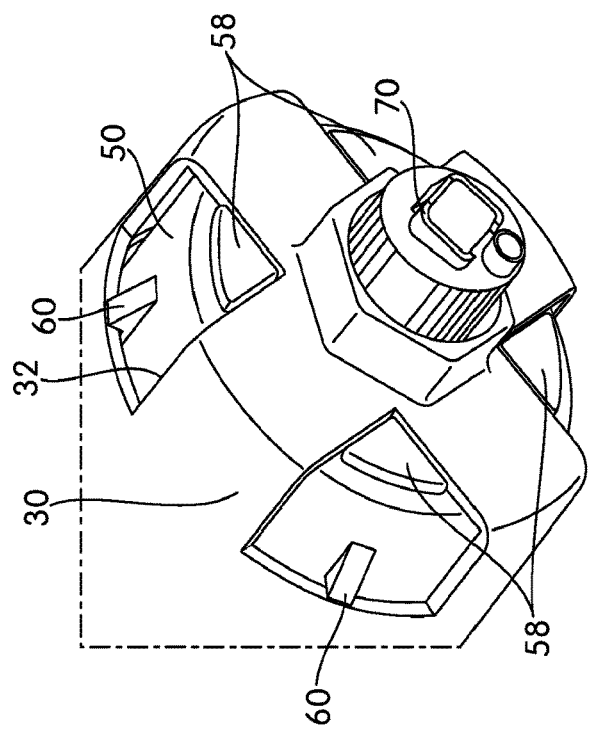
FIGS. 9A and 9B are perspective bottom views of a fuel filter according to another embodiment.
Figure 9A:
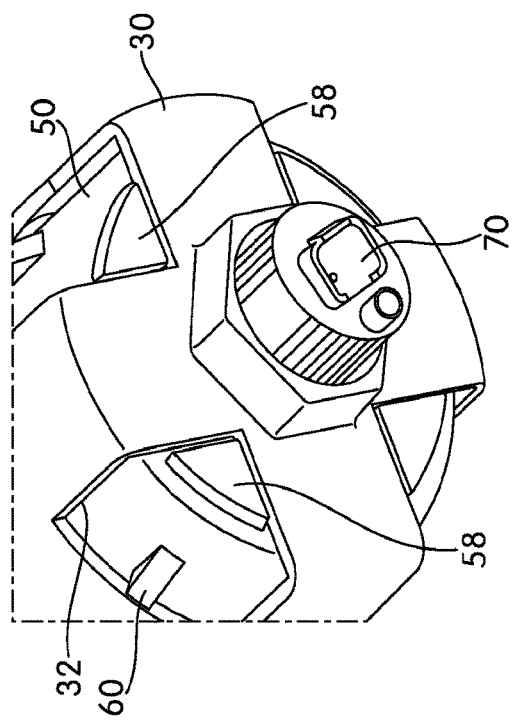

As shown in FIGS. 9A-9B, the fuel filter 20 may additionally or alternatively include protrusions 58 on the bowl 50 to help lock or secure the bowl 50 within the shell 30 and to prevent the bowl 50 from rotating. The protrusions 58 are be located on the bottom (as shown in FIGS. 9A and 9B) and/or the sides of the bowl 50 and positioned such that the protrusions 58 at least partially extend through the windows 32. The protrusions 58 are be shaped to fit within and be flush against or abut at least two inner sides or edges of the window 32 to prevent relative rotation between the bowl 50 and the shell 30. The bowl 50 includes multiple protrusions 58 to extend through multiple windows 32 for additional security, though it is also understood that the bowl 50 may include one protrusion 58.

Figure 10A:
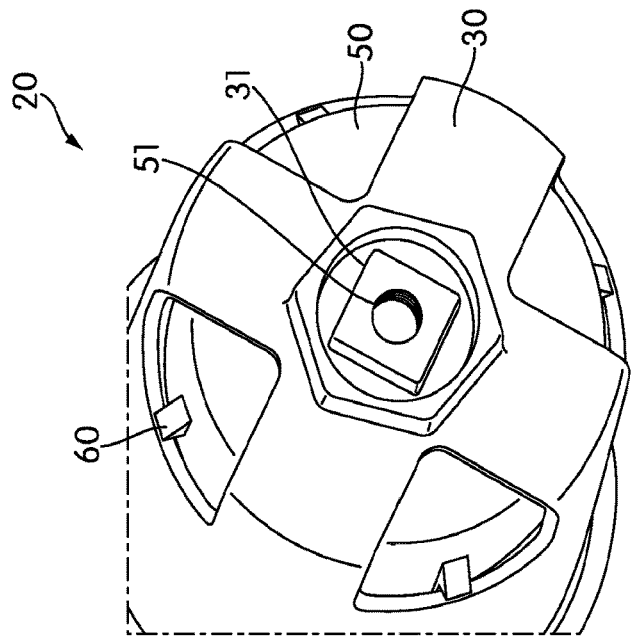
FIGS. 10A and 10B are perspective bottom views of a fuel filter according to still another embodiment.
Figure 10B:
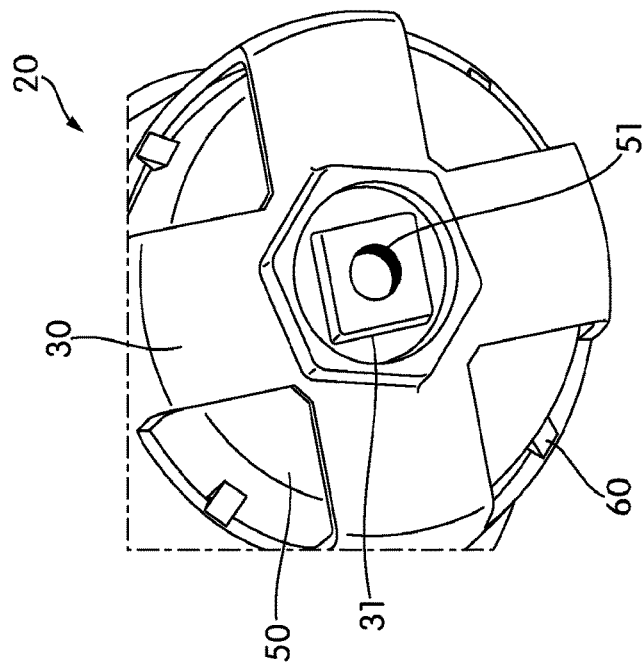

Alternatively or additionally as shown in FIGS. 10A-11B, the bowl 50 interlocks with the shell 30 through at least a portion of the shell spout 31 and the bowl spout 51. The bowl spout 51 extends from a bottom portion and outer surface of the bowl 50 and the shell spout 31 extends from a bottom portion and outer surface of the shell 30. Therefore, when the bowl 50 is installed in the shell 30, the bowl spout 51 fits within a portion of the shell spout 31. The complementary geometry of the shell spout 31 and bowl spout 51 may allow the bowl 50 and the shell 30 to further interlock and secure together, as well as prevent the bowl 50 from rotating within the shell 30. FIGS. 10A and 10B depict a bowl spout 51 with an outer square perimeter that fits flush within the shell spout 31, which may have an inner square perimeter. FIGS. 11A and 11B depict a bowl spout 51 with an outer hexagonal perimeter that fits flush within the shell spout 31 with an inner hexagonal perimeter. It is understood that the shell spout 31 and bowl spout 51 may include a variety of different complementary shapes, including but not limited to triangular, rectangular, oval, elliptical, etc. The bowl spout 51 may extend beyond the shell spout 31. However, as shown in FIG. 1B, the bowl spout 51 of the bowl 50 extends at least partially through or fits in a portion of the shell spout 31 of the shell 30.

Alternatively or additionally and according to another embodiment as shown in FIGS. 12A-12B, an adhesive material 82 is used to attach the shell 30 and the bowl 50 together. As shown in FIGS. 12A-12B, the adhesive material 82 may be positioned on or inserted into the lower end of the shell 30, contacting both the shell 30 and the bowl 50. It is understood that a variety of different adhesive materials 82 may be used according to the desired configuration, including but not limited to polyurethane or epoxy.

In order to attach the shell 30 and the bowl 50 together with the adhesive material 82, the bowl 50 is inserted into and positioned within the shell 30 and the adhesive material 82 is poured in a pocket provided at the interface between the shell 30 and the bowl 50, as shown in FIG. 12C. The adhesive material 82 at least partially fills this pocket, as shown in FIG. 12D. The adhesive material 82 thus provides a joint between the shell 30 and the bowl 50 and secures the shell 30 and the bowl 50 together, preventing any relative rotation and/or vertical movement.

Alternatively or additionally, and according to embodiments shown in FIGS. 13A-13D and 14A-14F, the fuel filter 20 includes an additional securing feature, sleeve, or part to secure and hold the bowl 50 in place within the shell 30 and prevent the bowl 50 from being forced out of the shell 30, even with an internal pressure. The additional securing part in FIGS. 13A-13D is shown as a ring 84 and the additional securing part in FIGS. 14A-14F is shown as a clip 86 (although it is understood that the ring 84 may be a clip and/or the clip 86 may be a ring). The additional securing part (e.g., the ring 84 or the clip 86) allows the bowl 50 to be firmly secured and held within the shell 30 without any additional attachment mechanisms.

In FIGS. 13A-13D, the additional securing ring 84 is configured to be placed within the shell 30 and is shaped as a ring in order to prevent any interference with the functionality of the fuel filter 20. The securing ring 84 may be press fit, snap fit, or welded to the shell 30. According to one embodiment, the securing ring 84 is sandwiched between the abutment 36 on the shell 30 and the upper rim of the bowl 50. Therefore, the securing ring 84 can also have a custom height to ensure a secure fit of the bowl 50 beneath the abutment 36.

In order to assemble the securing ring 84 into the fuel filter 20, the bowl 50 is inserted into the shell 30 (as shown in FIG. 13B) and is moved past the abutment 36. The securing ring 84 is then inserted into the shell 30 (as shown in FIG. 13C), such that the securing ring 84 is positioned above the bowl 50 and beneath the abutment 36 (as shown in FIG. 13D), thus preventing any relative vertical movement between the shell 30 and the bowl 50.

Figure 14D:
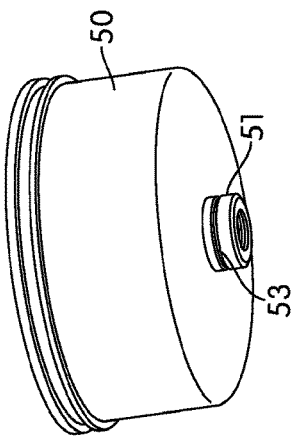
FIGS. 14C-14D are perspective views of the securing clip and the bowl, respectively, of the fuel filter of FIG. 14A.
Figure 14G:
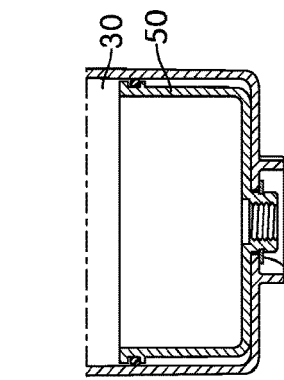
FIGS. 14E-14G are cross-sectional views of the fuel filter of FIG. 14A being assembled.
Figure 14C:
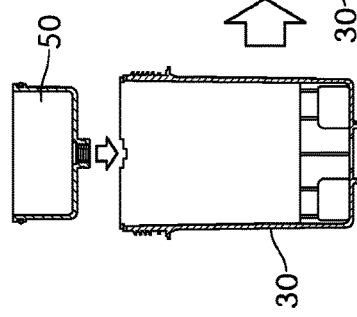
Figure 14F:
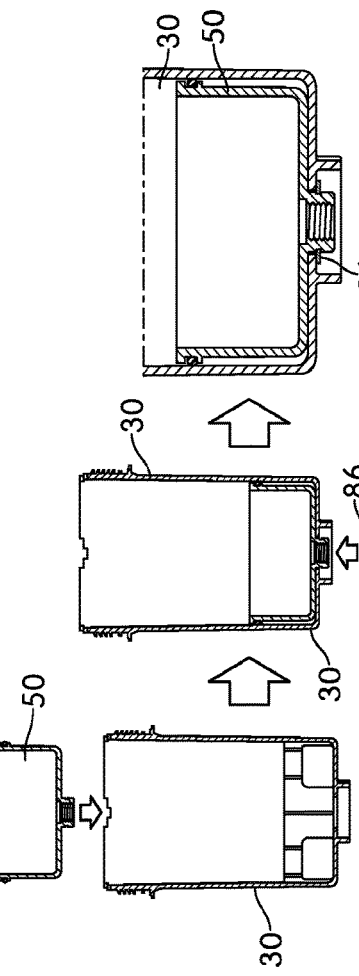
Figure 14E:
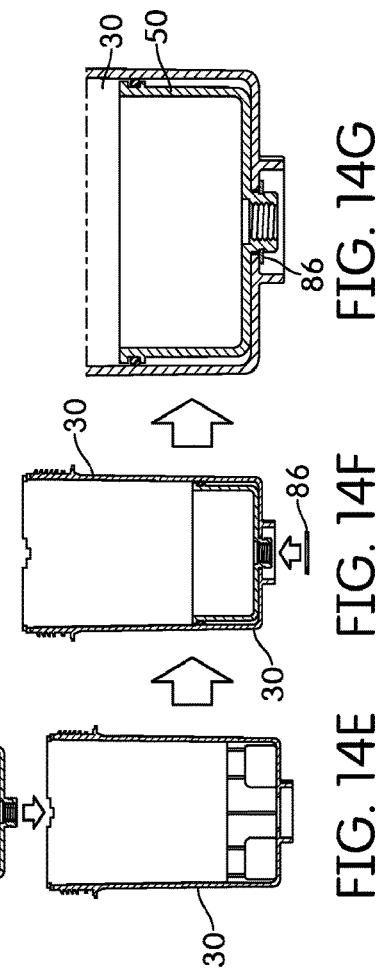
Figure 14A:
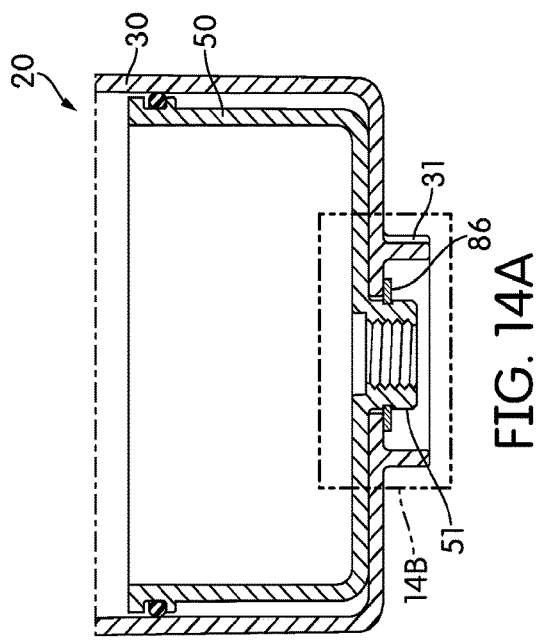
FIG. 14A is a cross-sectional view of a fuel filter according to still another embodiment.
Figure 14B:
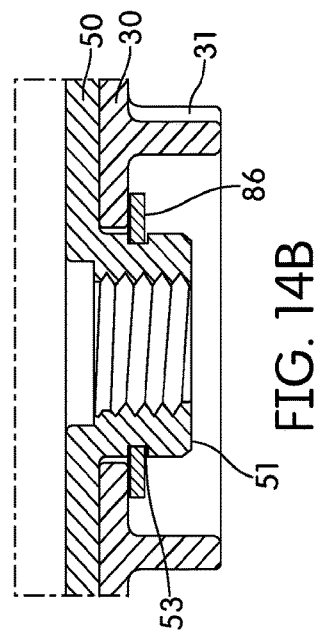
FIG. 14B is an enlarged view of Section 14B in FIG. 14A.

In FIGS. 14A-14G, the additional securing clip 86 (e.g., a circlip) is configured to attach to a bottom portion of the bowl 50 (e.g., an exposed end of the spout 51) that protrudes out from within the shell 30. The exposed end of the spout 51 may be a portion of the spout 51 that is exposed out from the shell 30 when the bowl 50 is installed in the shell 30. As shown in FIG. 14D, the clip 86 is shaped as a ring with an opening along the perimeter to allow the clip 86 to be initially easily attached to the spout 51, while maintaining a secure connection between the shell 30 and the bowl 50 after installation. The clip 86 may include two holes that may be pulled together and attached to create a tighter connection. As shown in FIGS. 14B and 14D, the spout 51 of the bowl 50 has a lip, groove or slot 53 along its outer perimeter that the clip 86 can snap into to properly position and hold the clip 86. Since the spout 51 of the bowl 50 may extend into the spout 31 of the shell 30, the clip 86 (with the spout 51) may also be positioned within spout 31.

In order to assemble the securing clip 86 into the fuel filter, the bowl 50 is inserted into the shell 30 (as shown in FIG. 14E). The clip 86 is then inserted around the outer circumference of the spout 51 (as shown in FIG. 14F) and into the slot 53, thus preventing the bowl 50 from moving vertically relative to the shell 30.

Figure 15G:
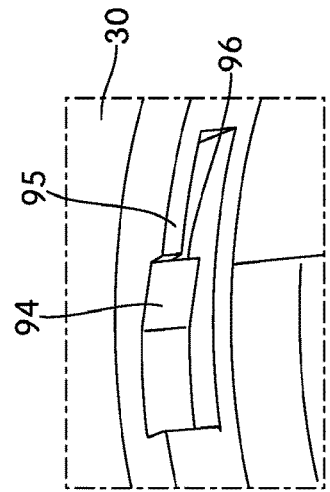
FIG. 15G is a perspective view of a portion of the shell of the fuel filter of FIG. 15A.
Figure 15E:
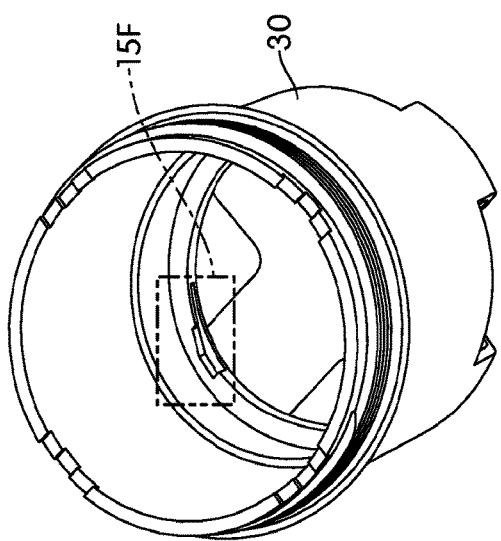
FIG. 15E is a top perspective view of the shell of FIG. 15A.
Figure 15F:
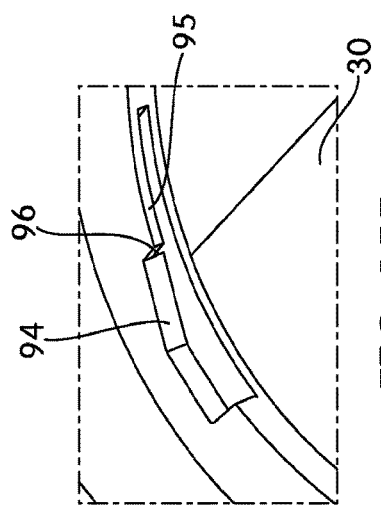
FIG. 15F is an enlarged view of Section 15F in FIG. 15E.

According to another embodiment, and as shown in FIGS. 15A-15M, the fuel filter 20 includes horizontal snaps 92 and slots 94 to attach the shell 30 and bowl 50 together and prevent relative vertical and rotational movement. As shown in FIGS. 15A-15C, the shell 30 includes at least one pocket, hole, crevice, indentation, or aperture 98 and the outer surface of the bowl 50 includes at least one extension, protrusion, hook, or snap 92. As shown in FIGS. 15E-G, the inner surface of the shell 30 also includes horizontally-orientated, guiding slot 94 with a ramp leading to the aperture 98, a horizontal rib 95 over a portion of the slot 94 to prevent the bowl 50 from moving vertically during installation, and an attachment edge 96 between the slot 94 and the aperture 98. Accordingly, as described further herein, the slot 94 rotationally guides the travel of the bowl 50 as the bowl 50 is being locked to the shell 30 and the aperture 98 allows the bowl 50 to be snap fit to the shell 30.

In order to assemble and lock the bowl 50 and the shell 30, the bowl 50 is inserted into the shell 30 (as shown in FIG. 15H), such that the snap 92 is inserted and guided into the slot 94 (as shown in FIG. 15I). Once the bowl 50 has been fully inserted into the shell 30, the bowl 50 is then rotated (as shown in FIG. 15J), such that the snap 92 is guided within the slot 94 and moved toward the aperture 98. After sufficient rotation, the snap 92 extends out of the aperture 98 and locks against an attachment edge 96 between the aperture 98 and the slot 94 (as shown in FIGS. 15K-15M), thus locking the shell 30 and the bowl 50 together and ensuring that the bowl 50 will not move (rotationally or vertically) relative to the shell 30 after installation.

Servicing the Fuel Filter

Figure 16:
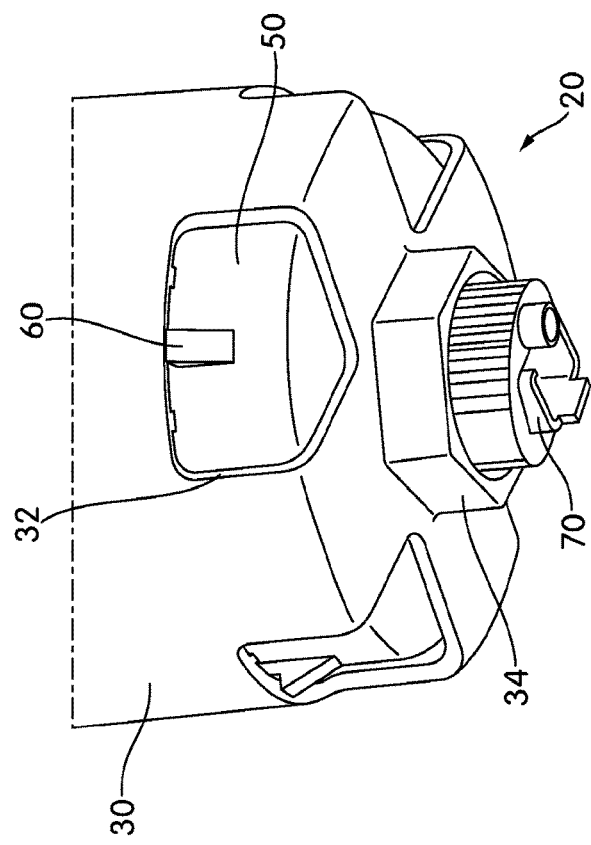
FIG. 16 is a perspective bottom view of the fuel filter of FIG. 1A.
Figure 17B:
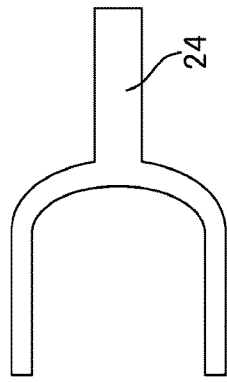
FIG. 17B is a bottom view of a tool to connect with the fuel filter of FIG. 17A.
Figure 17A:
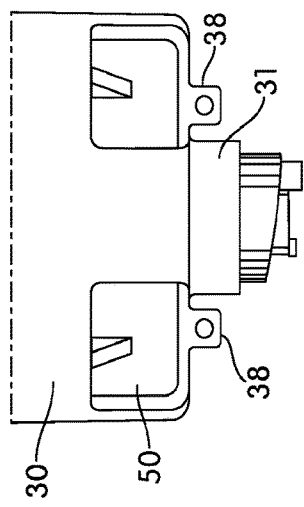
FIG. 17A is a front view of a fuel filter according to another embodiment.
Figure 17C:
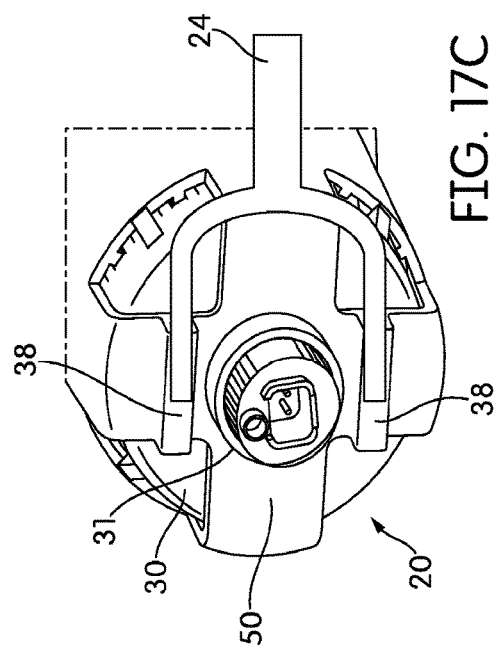
FIG. 17C is a bottom perspective view of the fuel filter of FIG. 17A and the tool of FIG. 17B.

Referring now to FIGS. 16-17C, according to one embodiment the fuel filter 20 may be designed to minimize, prevent, or avoid damage or device failure while the fuel filter 20 is being serviced. In general, the bowl 50 may be more prone to breaking during servicing. Therefore, the shell 30 may be shaped in order to both protect and shield the bowl 50, as well as allow the fuel filter 20 to be easily serviced. For example, the shell 30 may include at least one gripping feature to allow the servicing (and any resulting applied torque) to be performed on the shell 30, which may be a relatively stronger component, instead of the bowl 50, which may be more prone to breaking, delicate, or brittle than the shell 30. The gripping feature can be firmly grasped or held while the filter 20 is being serviced, such that the bowl 50 does not need to be directly grasped during servicing.

According to one embodiment as shown in FIG. 16 (as well as FIGS. 1A-2B), the gripping feature is a HEX feature 34 positioned along the shell spout 31 of the shell 30 (instead of on the bowl) and at least partially around the WIF-drain 70 to allow the shell 30 (instead of the bowl 50) to be gripped and secured along the outside portion during, for example, servicing events. The bowl spout 51 of the bowl 50 extends at least partially within the HEX feature 34, as described previously. However, it is understood that the fuel filter 20 may be serviced with a variety of different mechanisms and procedures. Although the HEX feature 34 is shown as a hexagonal projection from the shell 30, it is understood that the HEX feature 34 may have a different geometry, such as rectangular or triangular.

Alternatively or additionally as shown in FIGS. 17A-17C, the gripping feature is at least one projection 38 extending along and from the outside surface of the shell 30, which may also be used to allow the fuel filter 20 to gripped while being serviced. The projection 38 includes a hole or notch to allow a tool 24 (as shown in FIG. 17B), such as a wrench, to fit within or around. As shown in FIGS. 17A, 17C, 20C, 20D, 21C, and 21D, the projections 38 are located along a bottom portion of the shell on either side of the shell spout 31. The projections 38 have a hole for the tool 24 to grip, slide along, or move within to allow a user to hold or manipulate the fuel filter 20 in order to, for example, service the fuel filter 20. The projections 38 extend horizontally along a portion of the length of the bottom of the shell 30 (as shown in the figures). However, it is also understood that the projections 38 may be positioned along the vertical sides of the shell 30.

The WIF-Drain of the Fuel Filter

According to one embodiment, the WIF-drain 70 is accommodated or integrated within at least one of the shell spout 31 and the bowl spout 51. For example, the WIF-drain 70 may be screwed into the bowl spout 51 of the bowl 50 and/or the shell spout 31 of the shell 30, such that a portion of the WIF-drain 70 is within the bowl 50 and a portion of the WIF-drain 70 is outside of the shell 30, as shown in FIG. 3.

The WIF-drain 70 may be attached to the fuel filter through a variety of different mechanisms. According to one embodiment as shown in FIGS. 4B, 7A, 7B, and 18, the WIF-drain 70 has a threaded attachment 72 with the bowl spout 51 of the bowl 50. Both the WIF-drain 70 and the bowl spout 51 have complementary threads, such that the WIF-drain 70 may be screwed onto the bowl 50.

Alternatively or additionally according to another embodiment as shown in FIGS. 19A-19E, the WIF-drain 70 has a threaded attachment 72 with or screws into a portion of the shell 30 (such as the shell spout 31). However, it is also understood that the WIF-drain 70 may have a threaded attachment 72 with both the shell 30 and the bowl 50. Alternatively or additionally, the WIF-drain 70 may attach to the fuel filter 20 through a variety of other mechanisms, such as snaps or hooks.

Figure 18:
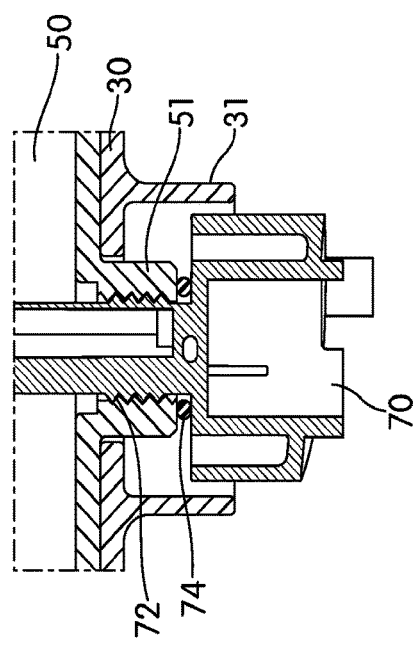
FIG. 18 is a cross-sectional view of a connection between a WIF-drain and a bowl of a fuel filter according to still another embodiment.
Figure 19E:
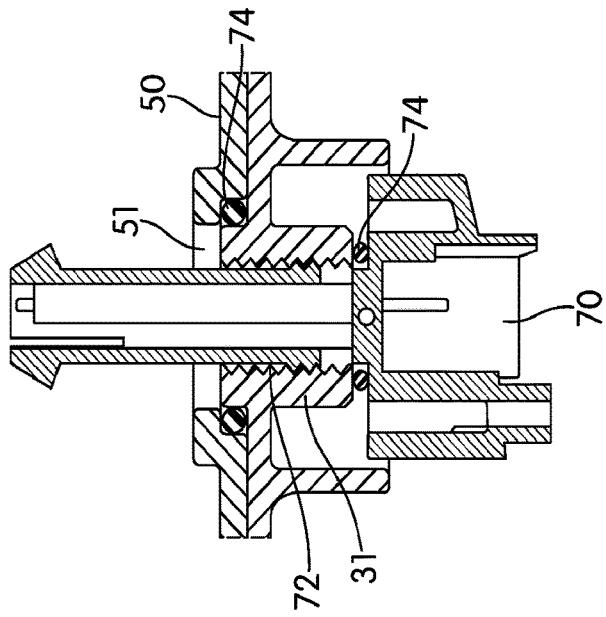
Figure 19D:
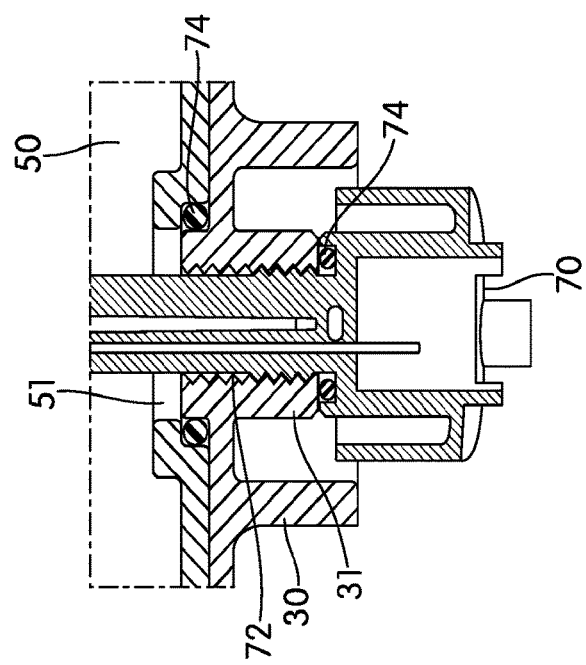
Figure 20E:
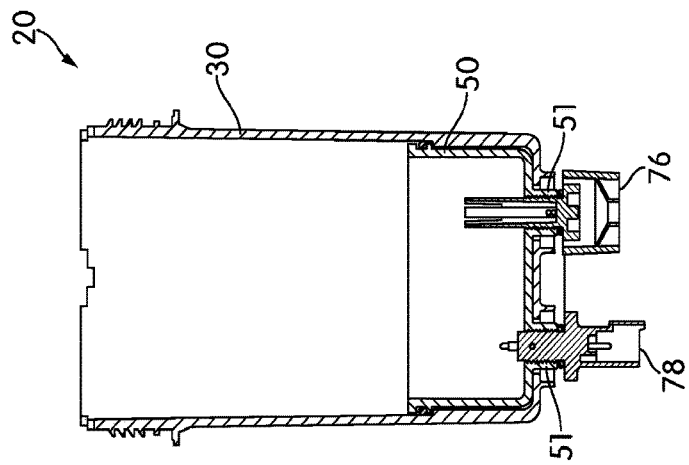
Figure 20C:
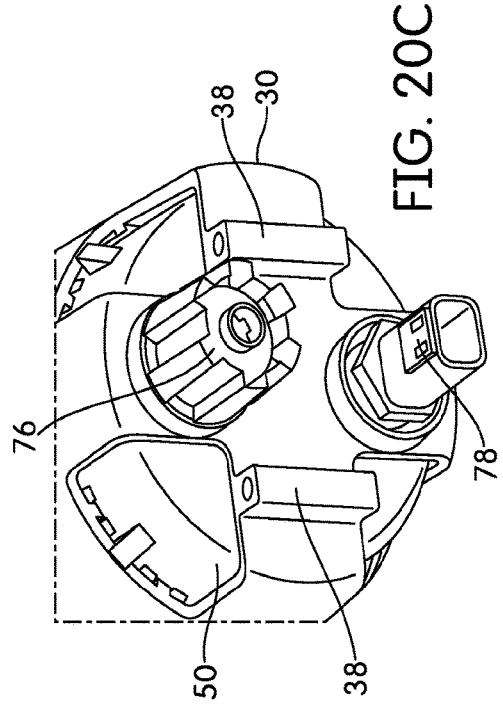
Figure 20D:
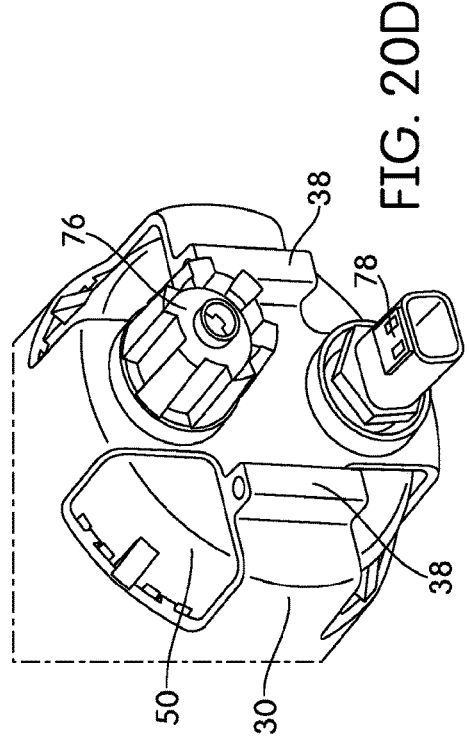
Figure 21A:
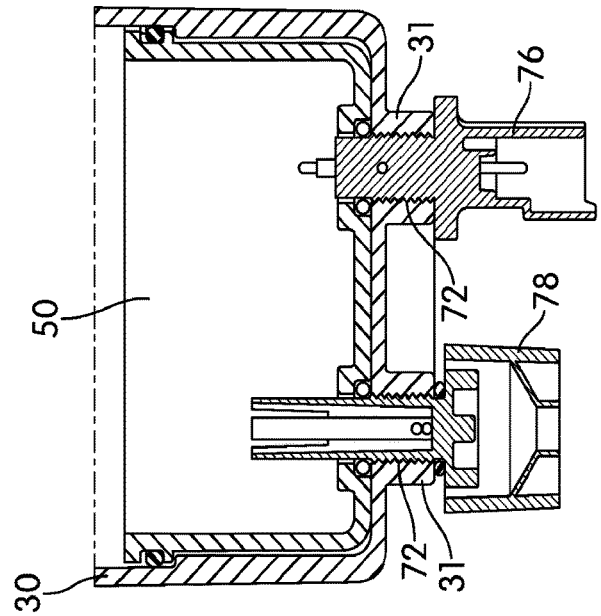
Figure 21B:
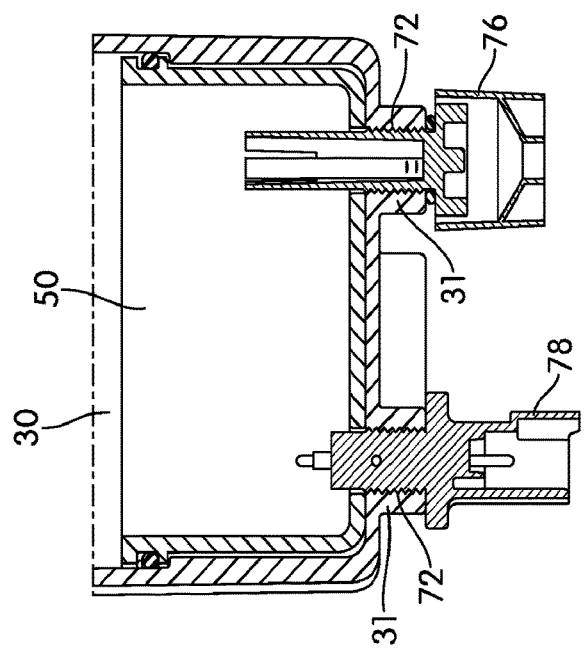
Figure 22D:
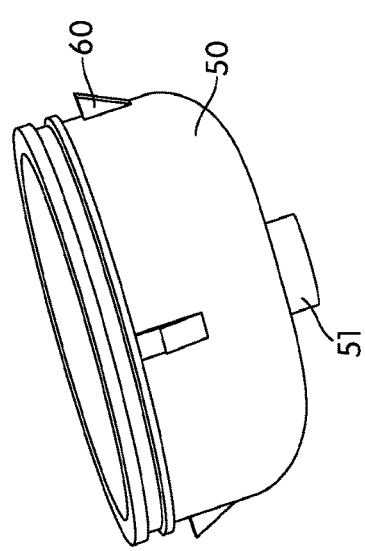
FIGS. 22D and 22E are perspective views of a bowl and a shell that can be disposed in the fuel filter of FIG. 22A.
Figure 22E:
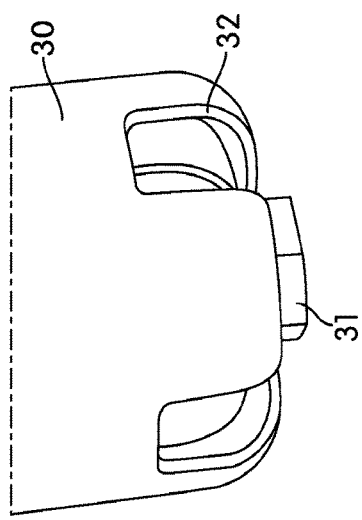
Figure 22C:
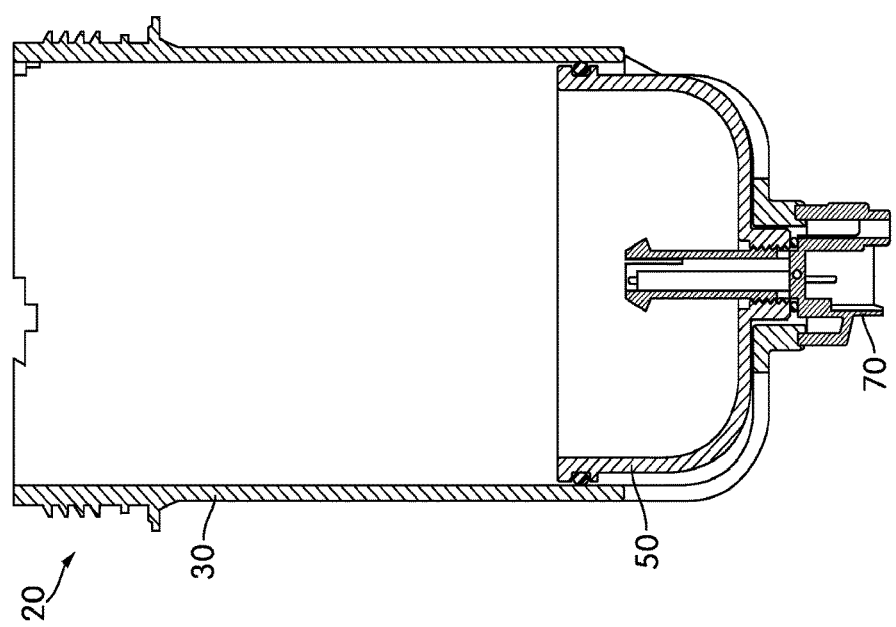

According to another embodiment as shown in FIG. 18, the WIF-drain 70 includes an o-ring 74 positioned between the WIF-drain 70 and bowl 50 to provide a fluid seal therebetween. As shown in FIGS. 19A-19E, an o-ring 74 is positioned between the shell spout 31 and bowl spout 51 of the shell 30 and the bowl 50, as well as between the WIF-drain 70 and the shell 30.

According to another embodiment as shown in FIGS. 20A-21E, the drain 76 and the WIF sensor 78 are separate components and extend through separate openings or spouts within the fuel filter 20. The WIF sensor 78 and the drain 76 attach and are positioned in a similar manner to the fuel filter 20 as the WIF-drain 70. The WIF sensor 78 and the drain 76, for example, extend at least partially through the fuel filter 20 (e.g. through the bowl 50 and the shell 30). As shown in FIGS. 20C, 20D, 21C, and 21D, the drain 76 and the WIF sensor 78 both extend from the bottom of the fuel filter 20 (through the bowl 50 and the shell 30) and are positioned on opposite sides of the bottom of the fuel filter 20. However, it is understood that the drain 76 and the WIF sensor 78 may be located on the same side or adjacent to each other, according to the desired configuration.

As shown in FIGS. 20A-20E, the drain 76 and the WIF sensor 78 have a threaded attachment 72 with a portion of the bowl 50, such as the bowl spout 51. According to another embodiment as shown in FIGS. 21A-21E, the drain 76 and the WIF sensor 78 have a threaded attachment 72 with a portion of the shell 30, such as the shell spout 31. However, it is also understood that one of the drain 76 and the WIF sensor 78 may have a threaded attachment 72 with the shell spout 31, while the other of the drain 76 and the WIF sensor 78 may have a threaded attachment with the bowl spout 51. It is further understood that at least one of the drain 76 and the WIF sensor 78 may have a threaded attachment 72 with both shell spout 31 and bowl spout 51.

As shown in FIGS. 20C, 20D, 21C, and 21D, the drain 76 and the WIF sensor 78 (as well as the WIF-drain 70) may be configured to include additional attachments or components, such as a cap, nozzle, sensor attachment, or valve.

Referring now to FIGS. 22A-22E, there is shown another embodiment of the fuel filter 20 with a bowl 50 in an oval shape. Accordingly, at least one of the inside shape, size, and contours of the shell 30 may complement that of the bowl 50. However, it is understood that the bowl 50 may be shaped, sized, and contoured in a wide variety of configurations, such as round, elliptical, pyramidal, spherical, cylindrical, dome, etc.

The fuel filter 20 may be constructed out of a variety of different materials, according to the desired configuration. For example, the shell 30 may be made out of a variety of different materials, including but not limited to plastic or metal. The bowl 50 may also be made out of a variety of at least partially transparent, clear, or translucent materials to allow the level of liquid to be shown through the bowl 50 and through the windows 32 of the shell 30. For example, the bowl 50 may be constructed out of plastic or glass. Since the shell 30 and the bowl 50 may be two separate components, different materials may be used for the shell 30 and the bowl 50.

According to another embodiment, the fuel filter 20 and its components may be color coded in order to differentiate the various parts and components within the system. Additionally, the bowl 50 and/or shell 30 may have etchings, markings, or labels to indicate the levels of serviceability or liquid level or volume.

The fuel filter 20 may be used with a variety of different filter components, which may be permanent or replaceable. For example, replaceable cartridges may be used within the fuel filter 20, decreasing the total cost of the system. Alternatively or additionally, the fuel filter 20 may have a modular system in which multiple components are attached together, temporarily or permanently, to form the fuel filter 20.

Due to the configuration of the fuel filter 20, the fuel filter 20 may be able to handle a variety of larger burst and fatigue pressures, including but not limited to 6-8 bars.

It is anticipated that the various components, configurations, and features of the different embodiments of the fuel filter 20 may be combined according to the desired use and configuration.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A filter housing assembly, comprising:
   a shell comprising at least one viewing region, an extension that extends radially inwardly from an inner surface of the shell, and a shell spout that extends from an outer surface of the shell;
   a translucent bowl that fits and is installable within the shell, the bowl positionable within the shell such that at least a portion of the bowl is visible through the viewing region, the bowl comprising a bowl spout that extend from an outer surface of the bowl and fits within a portion of the shell spout when the bowl is installed in the shell,
   an outer perimeter of the bowl spout fits flush within, has complementary geometry to, and directly interlocks with an inner perimeter of the shell spout such that the bowl spout and the shell spout prevent rotational movement between the shell and the bowl when the bowl is installed within the shell; and
   an attachment mechanism that securely attaches the bowl and the shell together and prevents at least one of vertical and rotational movement between the bowl and the shell, the attachment mechanism comprises the extension that prevents the bowl from moving at least one of vertically and horizontally within the shell, wherein the shell and the bowl are not threaded to each other.

2. The filter housing assembly of claim 1, wherein the bowl is attachable to, detachable from, and reattachable to the shell.

3. The filter housing assembly of claim 1, wherein the bowl spout and the shell spout are aligned with each other such that an inner region of the bowl is accessible through the shell spout and the bowl spout.

4. The filter housing assembly of claim 3, wherein at least one of the bowl spout and the shell spout are attachable with at least one of a drain, a WIF sensor, or a WIF-drain combination.

5. The filter housing assembly of claim 1, wherein the viewing region extends along at least a portion of a vertical height of the shell and along a lower horizontal end of the shell.

6. The filter housing assembly of claim 1, wherein the bowl is transparent.

7. The filter housing assembly of claim 1, wherein the shell includes a gripping feature that is graspable so as to allow the filter housing assembly to be firmly held while the filter housing assembly is being serviced such that the bowl is not directly grasped during servicing.

8. The filter housing assembly of claim 7, wherein the gripping feature includes a hex feature that defines an outer perimeter of the shell spout of the shell.

9. The filter housing assembly of claim 7, wherein the gripping feature includes a projection extending from an outside surface of the shell.

10. The filter housing assembly of claim 1, wherein the attachment mechanism includes at least one snap extending from the outer surface of the bowl, the at least one snap is lockable to at least one inner edge of the viewing region of the shell when the bowl is installed in the shell.

11. The filter housing assembly of claim 1, wherein the extension of the attachment mechanism is an abutment that prevents the bowl from vertically moving within the shell.

12. The filter housing assembly of claim 11, wherein a distance between the abutment and a bottom surface of the shell is less than a height of the bowl, and wherein the bowl includes an indentation along the outer surface of the bowl that is complementary to the abutment, such that the abutment snaps into the indentation when the shell is installed in the bowl.

13. The filter housing assembly of claim 1, wherein the extension of the attachment mechanism is a first plurality of vertical ribs, and
   wherein the attachment mechanism further comprises a second plurality of vertical ribs that extend from the outer surface of the bowl,
   wherein the first plurality of ribs and the second plurality of ribs interlock with each other when the bowl is installed in the shell such that relative rotational movement is prevented.

14. The filter housing assembly of claim 1, wherein the attachment mechanism includes at least one protrusion that extends from the outer surface of the bowl, wherein the at least one protrusion extends at least partially through the viewing area when the bowl is installed in the shell and abut at least two inner edges of the viewing area.

15. The filter housing assembly of claim 1, wherein the attachment mechanism includes an adhesive material attachable to an interface between the shell and the bowl.

16. The filter housing assembly of claim 1, wherein the attachment mechanism includes a securing clip that is attachable around an end of the bowl spout after the bowl has been installed in the shell, and wherein the end of the bowl spout is exposed out from the shell.

17. The filter housing assembly of claim 1, wherein the attachment mechanism includes at least one horizontal snap extending from the outer surface of the bowl and a complementary slot within the inner surface of the shell, wherein the snap is inserted into the slot and the bowl is rotated such that the snap locks onto an attachment edge on the shell in order to rotationally lock the bowl and the shell.

18. The filter housing assembly of claim 1, wherein the outer perimeter of the bowl spout and the inner perimeter of the shell spout are non-circular.

19. A filter housing assembly comprising
a shell with at least one viewing region;
a translucent bowl that fits and is installable within the shell, the bowl positionable within the shell such that at least a portion of the bowl is visible through the viewing region; and
an attachment mechanism that securely attaches the bowl and the shell together and prevents at least one of vertical and rotational movement between the bowl and the shell,
wherein the shell and the bowl are not threaded to each other,
wherein the attachment mechanism includes an abutment extending from an inner surface of the shell, the abutment preventing the bowl from vertically moving within the shell,
wherein a distance between the abutment and a bottom surface of the shell is greater than a height of the bowl, and wherein the bowl rests on the bottom surface of the shell when the bowl is installed in the shell.

20. The filter housing assembly of claim 19, further comprising a securing ring sandwiched between the abutment and an upper rim of the bowl when the bowl is installed in the shell.

21. A method of assembling a filter housing assembly, comprising:
inserting a translucent bowl into a shell such that at least a portion of the bowl is visible through at least one viewing region of the shell, the shell comprising an extension that extends radially inwardly from an inner surface of the shell and a shell spout that extends from an outer surface of the shell, the bowl comprising a bowl spout that extends from an outer surface of the bowl and fits within a portion of the shell spout when the bowl is installed in the shell; and
securing the bowl and the shell together with an attachment mechanism such that at least one of vertical and rotational movement between the bowl and the shell is prevented, the attachment mechanism comprises the extension that prevents the bowl from moving at least one of vertically and horizontally within the shell,
an outer perimeter of the bowl spout fits flush within, has complementary geometry to, and directly interlocks with an inner perimeter of the shell spout such that the bowl spout and the shell spout prevent rotational movement between the shell and the bowl when the bowl is installed within the shell,
wherein the shell and the bowl are not threaded to each other.

22. The method of claim 21, wherein the bowl spout and the shell spout are aligned with each other once the bowl has been inserted into the shell, such that an inner region of the bowl is accessible through the shell spout and the bowl spout.

23. The method of claim 21, wherein the shell includes a gripping feature that is graspable to allow the filter housing assembly to be firmly held while the filter housing assembly is being serviced such that the bowl is not directly grasped during servicing.

24. The method of claim 21, further comprising:
inserting a horizontal snap located on the outer surface of the bowl into a slot located on the inner surface of the shell; and
rotating the bowl within the shell such that the snap moves within the slot until the snap locks onto an attachment edge on the shell such that the bowl is rotationally locked to the shell.

* * * * *